(12) United States Patent
Oinuma et al.

(10) Patent No.: US 10,093,566 B2
(45) Date of Patent: Oct. 9, 2018

(54) WATER TREATMENT APPARATUS AND WATER TREATMENT METHOD

(71) Applicant: MITSUBISHI ELECTRIC CORPORATION, Chiyoda-ku (JP)

(72) Inventors: Gaku Oinuma, Chiyoda-ku (JP); Masakazu Taki, Chiyoda-ku (JP); Yasutaka Inanaga, Chiyoda-ku (JP); Makoto Takata, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 359 days.

(21) Appl. No.: 15/102,804

(22) PCT Filed: Jan. 13, 2015

(86) PCT No.: PCT/JP2015/050677
§ 371 (c)(1),
(2) Date: Jun. 8, 2016

(87) PCT Pub. No.: WO2015/111465
PCT Pub. Date: Jul. 30, 2015

(65) Prior Publication Data
US 2018/0134591 A1    May 17, 2018

(30) Foreign Application Priority Data

Jan. 23, 2014 (JP) .................................. 2014-010347
Jun. 20, 2014 (WO) .................. PCT/JP2014/066426

(51) Int. Cl.
*C02F 1/72* (2006.01)
*C02F 1/36* (2006.01)
(Continued)

(52) U.S. Cl.
CPC ................. *C02F 1/722* (2013.01); *C02F 1/36* (2013.01); *C02F 1/4608* (2013.01); *C02F 1/78* (2013.01);
(Continued)

(58) Field of Classification Search
CPC .......... C02F 1/36; C02F 1/4608; C02F 1/722; C02F 1/78; C02F 2101/30; C02F 2303/04; C02F 2305/023
See application file for complete search history.

(56) References Cited

U.S. PATENT DOCUMENTS

2004/0084382 A1* 5/2004 Ryazanova ............. C01B 13/11
                                                                210/748.11
2011/0076190 A1 3/2011 Tanaka et al.
2011/0240539 A1 10/2011 Nose et al.

FOREIGN PATENT DOCUMENTS

JP    2003-320373 A    11/2003
JP    2007-196121 A    8/2007
(Continued)

OTHER PUBLICATIONS

International Search Report dated Mar. 17, 2015 in PCT/JP15/050677 Filed Jan. 13, 2015.

*Primary Examiner* — Dirk R Bass
(74) *Attorney, Agent, or Firm* — Oblon, McClelland, Maier & Neustadt, L.L.P.

(57) ABSTRACT

In a water treatment apparatus, a tilted plate is disposed at an incline relative to a horizontal plane. Water to be treated is passed over the upper surface of the tilted plate. A discharge forming body is disposed across a gas layer above a water film formed by the water to be treated flowing over the tilted plate. A droplet forming apparatus exerts power on the water film so that at least some of the water to be treated shoots upward in the form of droplets.

11 Claims, 27 Drawing Sheets

(51) Int. Cl.
*C02F 1/78* (2006.01)
*C02F 1/46* (2006.01)
*C02F 101/30* (2006.01)

(52) U.S. Cl.
CPC ...... *C02F 2101/30* (2013.01); *C02F 2303/04* (2013.01); *C02F 2305/023* (2013.01)

(56) References Cited

FOREIGN PATENT DOCUMENTS

| | | | |
|---|---|---|---|
| JP | 2007-307486 | A | 11/2007 |
| JP | 4073240 | B2 | 4/2008 |
| JP | 4322728 | B2 | 9/2009 |
| JP | 2009-287823 | A | 12/2009 |
| JP | 4635204 | B2 | 2/2011 |
| JP | 2012-96141 | A | 5/2012 |
| JP | 4934119 | B2 | 5/2012 |
| WO | 2010/055729 | A1 | 5/2010 |

* cited by examiner

WATER TREATMENT APPARATUS AND WATER TREATMENT METHOD

TECHNICAL FIELD

This invention relates to a water treatment apparatus and a water treatment method for treating water to be treated using ozone, radicals, and so on generated by electrical discharge.

BACKGROUND ART

Ozone or chlorine is typically used in conventional water and sewage treatment. However, industrial wastewater, recycled water, and so on, for example, may contain persistent substances that are not decomposed by ozone or chlorine. Removal of dioxins, dioxane, and so on is particularly problematic.

A method of removing persistent substances by combining ozone ($O_3$) with hydrogen peroxide ($H_2O_2$) or ultraviolet light in order to generate hydroxyl radicals (OH radicals), which are more highly active than ozone or chlorine, in water to be treated is in partial use, but due to extremely high apparatus costs and running costs, this method has not become popular. Hence, a method of removing persistent substances efficiently by applying OH radicals generated through electrical discharge directly to the water to be treated has been proposed.

More specifically, a water treatment apparatus that treats water to be treated by applying a pulse voltage between a high voltage wire electrode and a cylindrical ground electrode surrounding the high voltage wire electrode in order to form a streamer discharge, and supplying the water to be treated in droplet form into a streamer discharge space from above using an ejection nozzle has been proposed. According to this water treatment apparatus, OH radicals, which have a short life, can be applied efficiently to the water to be treated (see PTL 1, for example).

A water treatment apparatus for treating water to be treated by disposing a pair of electrode plates that oppose each other vertically at an incline and pouring the water to be treated onto the lower electrode so that the water to be treated flows down over the lower electrode, whereby a barrier discharge is formed between the electrodes, has also been proposed. With this water treatment apparatus, the water to be treated can be treated efficiently using a simple configuration (see PTL 2, for example).

CITATION LIST

Patent Literature

[PTL 1]
Japanese Patent Publication No. 4934119 (page 1, lines 1 to 8 and FIG. 1)
[PTL 2]
Japanese Patent Publication No. 4635204 (page 1, lines 1 to 14 and FIG. 1)

SUMMARY OF INVENTION

Technical Problem

However, in the conventional water treatment apparatus disclosed in PTL 1, the water to be treated drops directly down into the streamer discharge space in droplet form, and therefore a contact time between the OH radicals existing in the streamer discharge space and the water to be treated is extremely short. Hence, to decompose a persistent substance or remove highly concentrated organic dirt, either the water to be treated must be circulated numerous times or a discharge power must be set extremely high. As a result, increases in the amount of energy consumed to draw up the water to be treated, the size of the apparatus, and so on occur. Moreover, since an ejection nozzle is used to form the droplets, contaminants in the water to be treated may adhere to the nozzle, causing the nozzle to become blocked over long-term use. As a result, frequent maintenance is required, leading to a reduction in a utilization rate of the apparatus and an increase in component replacement costs.

In the conventional water treatment apparatus disclosed in PTL 2, meanwhile, the ozone and OH radicals generated by discharge contact a surface of the water to be treated, whereupon a part thereof dissolves to form dissolved ozone or dissolved hydrogen peroxide. The water treatment then progresses as the dissolved ozone or dissolved hydrogen peroxide reacts in the water. However, the dissolved ozone and dissolved hydrogen peroxide are not agitated in the water to be treated, and therefore effective water treatment is limited to a region extremely close to the surface of the water to be treated, without progressing to a deep part.

This invention has been designed to solve the problems described above, and an object thereof is to obtain a water treatment apparatus and a water treatment method with which persistent substances can be decomposed and highly concentrated organic dirt can be removed efficiently and quickly while maintaining a high utilization rate.

Solution to Problem

A water treatment apparatus according to this invention includes a tilted plate disposed at an incline relative to a horizontal plane so that water to be treated flows over an upper surface thereof, a discharge forming body disposed across a gas layer above a water film formed by the water to be treated flowing over the tilted plate, and a droplet forming apparatus that treats the water to be treated by exerting power on the water film so that at least some of the water to be treated shoots up from the tilted plate in the form of droplets and the droplets come into contact with a discharge formed by the discharge forming body.

Further, a water treatment method according to this invention is a method of treating water to be treated by passing the water to be treated over an upper surface of a tilted plate disposed at an incline relative to a horizontal plane so that a water film is formed on the tilted plate while forming a discharge between at least a pair of electrodes disposed above the water film across a gas layer, and exerting power on the water film so that at least some of the water to be treated shoots upward from the tilted plate in the form of droplets and the droplets come into contact with the discharge. Furthermore, a water treatment method according to this invention is a method of treating water to be treated by passing the water to be treated over an upper surface of a tilted plate disposed at an incline relative to a horizontal plane so that a water film is formed on the tilted plate while forming a discharge between the tilted plate and an electrode disposed above the water film across a gas layer, and bringing the water film into contact with the discharge, wherein at least some of the water to be treated shoots upward from the tilted plate in the form of droplets by exerting power on the water film.

Advantageous Effects of Invention

In the water treatment apparatus and water treatment method according to this invention, the water to be treated flows over the upper surface of the tilted plate, which is inclined relative to the horizontal plane, so as to form a discharge, and at least some of the water to be treated is formed into droplets by the droplet forming apparatus. Hence, the water to be treated remains in contact with the discharge for a long time, and agitation of the water to be treated and intermixing of ozone or hydrogen peroxide dissolved into the water to be treated progress. As a result, decomposition of a persistent substance or removal of highly concentrated organic dirt can be achieved efficiently and quickly.

DESCRIPTION OF EMBODIMENTS

Embodiments of this invention will be described below with reference to the drawings.

First Embodiment

Figure 1:
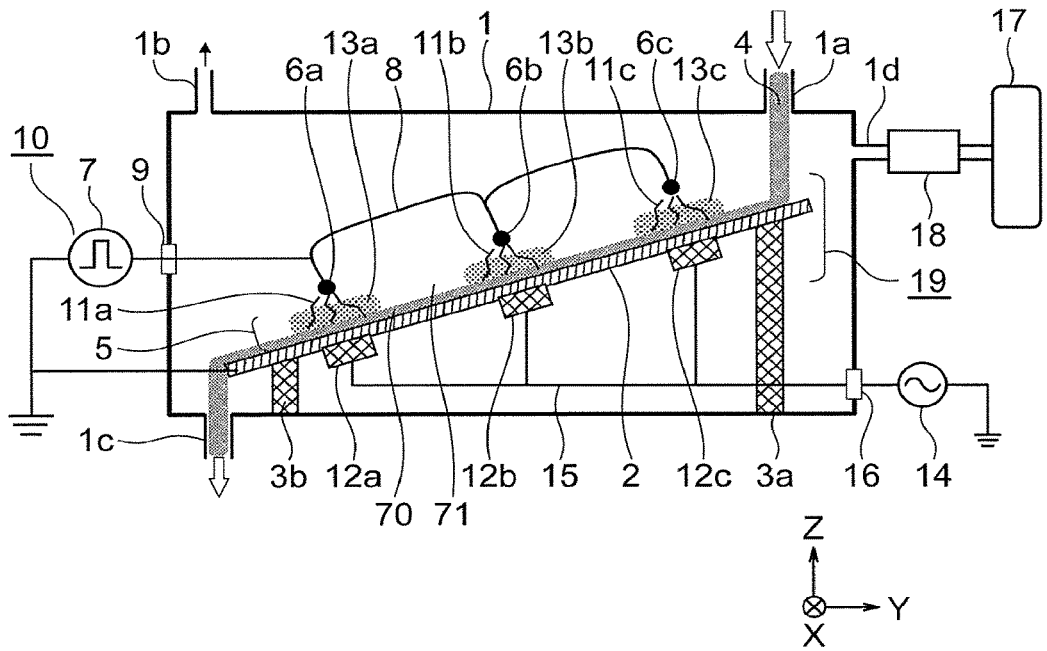
FIG. 1 is a sectional view showing a water treatment apparatus according to a first embodiment of this invention.

FIG. 1 is a sectional view showing a water treatment apparatus according to a first embodiment of this invention. In the drawing, a water feed port $1a$ and a gas discharge port $1b$ are provided in an upper portion of a metal treatment tank 1 having an airtight structure. A water discharge port $1c$ is provided in a lower portion of the treatment tank 1. A gas supply port 1d is provided on a side face of the treatment tank 1.

A plate electrode 2 constituted by a tilted plate is housed in the treatment tank 1. The plate electrode 2 is supported by an upstream side mount 3a and a downstream side mount 3b erected on a bottom surface of the treatment tank 1, and is disposed at an incline relative to a horizontal plane. In other words, an upstream side end portion (a right side end portion in FIG. 1) of the plate electrode 2 is higher than a downstream side end portion (a left side end portion in FIG. 1).

The upstream side end portion of the plate electrode 2 is disposed directly below the water feed port 1a. Water to be treated 4 is supplied to the treatment tank 1 through the water feed port 1a so as to flow diagonally downward over an upper surface of the plate electrode 2, and is discharged to the outside of the treatment tank 1 through the water discharge port 1c.

A plurality of (in this example, three) wire electrodes 6a, 6b, 6c serving as discharge forming bodies (electrodes) are disposed in the treatment tank 1 above the plate electrode 2 so as to oppose the plate electrode 2 across a void 5. The wire electrodes 6a, 6b, 6c are disposed at intervals in a flow-down direction of the water to be treated 4. Further, the wire electrodes 6a, 6b, 6c are disposed at equal intervals relative to the upper surface of the plate electrode 2. Furthermore, the wire electrodes 6a, 6b, 6c extend horizontally so as to be parallel to a width direction (an X axis direction in FIG. 1) of the plate electrode 2.

A pulse power supply 7 is disposed on the outside of the treatment tank 1. The wire electrodes 6a, 6b, 6c are connected to the pulse power supply 7 in parallel via wires 8. The pulse power supply 7 is electrically insulated from the treatment tank 1 by an insulating portion 9. The plate electrode 2 serves as a ground electrode that is electrically grounded. A discharge power supply portion 10 according to the first embodiment includes the pulse power supply 7 and the wires 8, and forms discharges 11a, 11b, 11c by applying a high voltage between the plate electrode 2 and the wire electrodes 6a, 6b, 6c.

A plurality of ultrasonic transducers 12a, 12b, 12c serving as a droplet forming apparatus (a droplet generation mechanism) are fixed to a lower surface of the plate electrode 2. The ultrasonic transducers 12a, 12b, 12c are disposed in alignment with the wire electrodes 6a, 6b, 6c. In this example, the ultrasonic transducers 12a, 12b, 12c are disposed on a rear side of the plate electrode 2 in parts opposing the respective wire electrodes 6a, 6b, 6c. Further, the ultrasonic transducers 12a, 12b, 12c exert power on the water to be treated 4 flowing over the plate electrode 2, causing at least some of the water to be treated 4 to shoot upward and form droplets. In other words, the ultrasonic transducers 12a, 12b, 12c generate droplets 13a 13b, 13c from the water to be treated 4 on the plate electrode 2.

In this example, the ultrasonic transducers 12a, 12b, 12c are respectively formed from piezoelectric ceramic (PZT). A high frequency power supply 14 is disposed on the outside of the treatment tank 1. The ultrasonic transducers 12a, 12b, 12c are connected in parallel to the high frequency power supply 14 via wires 15. The high frequency power supply 14 is electrically insulated from the treatment tank 1 by an insulating portion 16.

A gas supply source 17 filled with oxygen gas is connected to the gas supply port 1d via a flow regulator 18.

A water treatment unit 19 includes the plate electrode 2, the wire electrodes 6a, 6b, 6c, and the ultrasonic transducers 12a, 12b, 12c.

Figure 2:
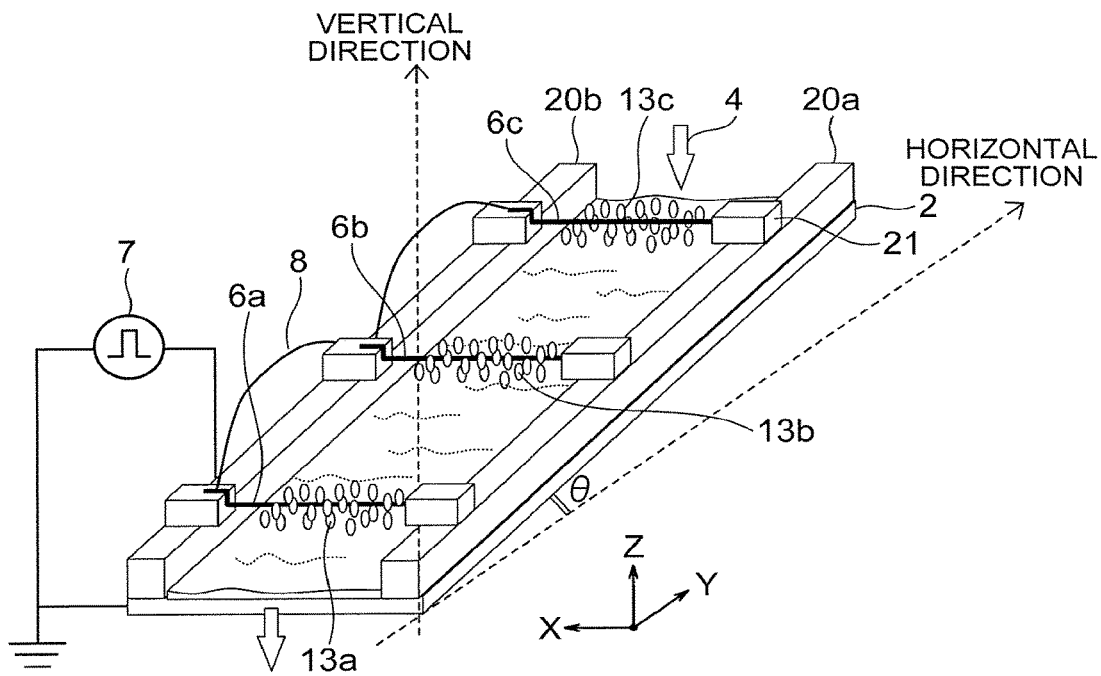
FIG. 2 is a perspective view showing main parts of the water treatment apparatus of FIG. 1.

FIG. 2 is a perspective view showing main parts of the water treatment apparatus of FIG. 1. The plate electrode 2 is tilted at an incline angle θ relative to a horizontal direction. A pair of side walls 20a, 20b are provided at respective width direction end portions of the plate electrode 2. The water to be treated 4 flows down over the plate electrode 2 between the side walls 20a, 20b. A plurality of pairs (in this example, three pairs) of support members 21 for holding the wire electrodes 6a, 6b, 6c are fixed to the side walls 20a, 20b.

Next, an operation will be described. The oxygen gas from the gas supply source 17 is regulated to a predetermined flow rate by the flow regulator 18, and then supplied to the treatment tank 1 through the gas supply port 1d. Gas in the treatment tank 1 is discharged through the gas discharge port 1b at an identical flow rate to the flow rate of the supplied oxygen gas. As a result, following the elapse of a predetermined time, air is discharged from the treatment tank 1 such that a high oxygen concentration atmosphere is formed in the treatment tank 1.

The water to be treated 4 supplied to the treatment tank 1 through the water feed port 1a forms a water film 70 on the plate electrode 2 between the side walls 20a, 20b, and flows down so as to be discharged through the water discharge port 1c. Here, a gas layer 71 is formed between the water film 70 and the wire electrodes 6a, 6b, 6c. In other words, a thickness of the water film 70 is regulated such that the gas layer 71 is formed between the wire electrodes 6a, 6b, 6c and a water surface of the water film 70. To put it another way, the thickness of the water film 70 is smaller than a distance between the wire electrodes 6a, 6b, 6c and the plate electrode 2. At this time, the high frequency power supply 14 is operated to drive the ultrasonic transducers 12a, 12b, 12c, and as a result, some of the water to be treated 4 is formed into the droplets 13a, 13b, 13c.

Further, by operating the pulse power supply 7 at this time such that a pulse voltage is applied to the wire electrodes 6a, 6b, 6c in a condition where a part of the void 5 is filled with oxygen gas, the discharges 11a, 11b, 11c are formed in the direction of the plate electrode 2 from the wire electrodes 6a, 6b, 6c. While flowing over the plate electrode 2, the water to be treated 4 passes the discharges 11c, 11b, 11a in sequence. Furthermore, the droplets 13a, 13b, 13c respectively contact the discharges 11c, 11b, 11a, whereby water treatment such as removal of persistent substances is performed on the water to be treated 4.

Figure 3:
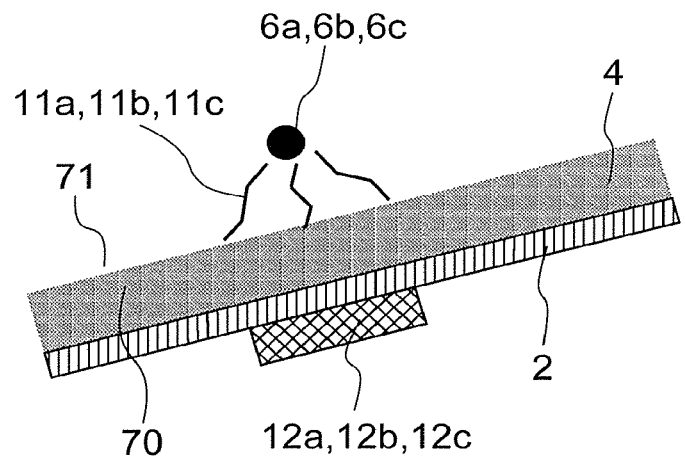
FIG. 3 is a sectional view showing water to be treated in a case where ultrasonic transducers shown in FIG. 1 are not driven.
Figure 4:
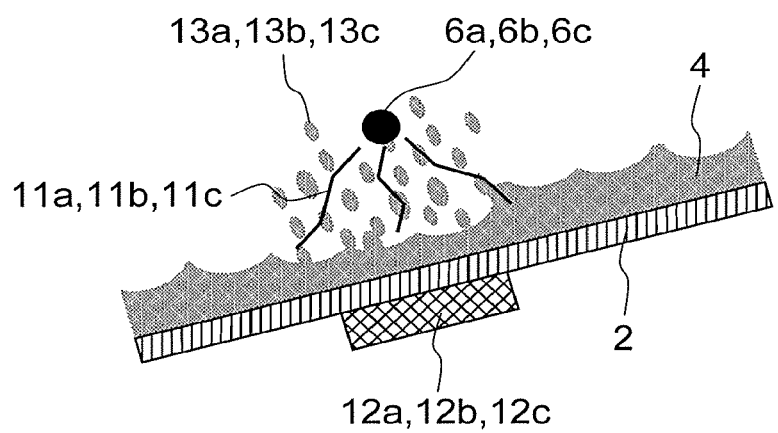
FIG. 4 is a sectional view showing the water to be treated in a case where the ultrasonic transducers shown in FIG. 3 are driven.

FIG. 3 is a sectional view showing the water to be treated 4 in a case where the ultrasonic transducers 12a, 12b, 12c shown in FIG. 1 are not driven, and FIG. 4 is a sectional view showing the water to be treated 4 in a case where the ultrasonic transducers 12a, 12b, 12c shown in FIG. 3 are driven.

When the ultrasonic transducers 12a, 12b, 12c are not driven, the discharges 11a, 11b, 11c are formed in the direction of the surface of the water to be treated 4 from the wire electrodes 6a, 6b, 6c, but the water to be treated 4 does not form droplets. When the ultrasonic transducers 12a, 12b, 12c are driven, on the other hand, the droplets 13a, 13b, 13c are formed in large numbers in regions where the discharges 11a, 11b, 11c are formed.

Further, the formed droplets 13a, 13b, 13c drop down due to gravity so as to coalesce with the water to be treated 4 flowing over the plate electrode 2. Therefore, when the ultrasonic transducers 12a, 12b, 12c are driven, the droplets 13a, 13b, 13c are formed and coalesce repeatedly at a high frequency.

Next, a principle of the water treatment performed by the water treatment apparatus according to the first embodiment will be described. Here, an example in which an organic substance is decomposed will be described. However, $O_3$ and OH radicals generated by electrical discharge are also effective in bacteria removal and bleaching.

When a pulse voltage is applied to the wire electrodes 6a, 6b, 6c, discharge occurs in the gas in the void 5, or in other words in the gas layer 71, or on an interface between the gas and the water to be treated 4. At this time, oxygen molecules ($O_2$) and water molecules ($H_2O$) collide with high energy electrons, generating a dissociative reaction shown in Equations (1) and (2). Here, e denotes an electron, O denotes atomic oxygen, H denotes atomic hydrogen, and OH denotes an OH radical.

$$e + O_2 \rightarrow 2O \quad (1)$$

$$e + H_2O \rightarrow H + OH \quad (2)$$

A part of the atomic oxygen generated in Equation (1) forms ozone ($O_3$) in a reaction shown in Equation (3). Here, M denotes a third body of the reaction, which may be any molecule or atom in a gas.

$$O + O_2 + M \rightarrow O_3 \quad (3)$$

Further, a part of the OH radical generated in Equation (2) forms hydrogen peroxide ($H_2O_2$) in a reaction shown in Equation (4).

$$OH + OH \rightarrow H_2O_2 \quad (4)$$

Oxidizing particles such as O, OH, $O_3$, and $H_2O_2$ generated in the reactions of Equations (1) to (4) decompose an organic substance on the surface of the water film 70 and the surfaces of the droplets 13a, 13b, 13c in the water to be treated 4 through oxidation in accordance with a reaction shown in Equation (5), whereby the organic substance turns into carbon dioxide ($CO_2$) and water. Here, R denotes the organic substance serving as the treatment subject.

$$R + (O, OH, O_3, H_2O_2) \rightarrow CO_2 + H_2O \quad (5)$$

Meanwhile, a part of the $O_3$ and $H_2O_2$ generated in accordance with Equations (3) and (4) dissolves into the water to be treated 4 through the surface of the water film 70 and the surfaces of the droplets 13a, 13b, 13c in accordance with Equations (6) and (7). Here, (l) denotes a liquid phase.

$$O_3 \rightarrow O_3 (l) \quad (6)$$

$$H_2O_2 \rightarrow H_2O_2 (l) \quad (7)$$

Furthermore, the $O_3$ (l) and the $H_2O_2$ (l) react with each other such that an OH radical is generated in the water, as shown in Equation (8).

$$O_3 (l) + H_2O_2 (l) \rightarrow OH (l) \quad (8)$$

The $O_3$ (l), $H_2O_2$ (l), and OH (l) generated in accordance with Equations (6) to (8) decompose the organic substance through a reaction in water, as shown in Equation (9).

$$R + (O_3 (l), H_2O_2 (l), OH (l)) \rightarrow CO_2 + H_2O \quad (9)$$

According to the first embodiment, as described above, decomposition of the organic substance in the water to be treated 4 progresses through both decomposition of the organic substance on the surface of the water film 70 and the surfaces of the droplets 13a, 13b, 13c, as shown in Reaction (5), and decomposition of the organic substance in the water of the water film 70 and in the water of the droplets 13a, 13b, 13c, as shown in Reaction (9).

Hence, with the water treatment apparatus and water treatment method according to the first embodiment, the water to be treated 4 flows over the upper surface of the plate electrode 2, which is tilted relative to the horizontal plane, such that the discharges 11a, 11b, 11c are formed between the plate electrode 2 and the wire electrodes 6a, 6b, 6c while at least some of the water to be treated 4 is formed into droplets by the ultrasonic transducers 12a, 12b, 12c. Therefore, the reactions of Equations (5) and (9) can be generated a large number of times, and as a result, highly concentrated organic dirt can be removed efficiently and quickly.

In other words, the water to be treated 4 flows over the tilted plate electrode 2, and therefore flows down at a lower speed than in a case where the water to be treated 4 flows down vertically. As a result, the water to be treated 4 remains in contact with the discharges 11a, 11b, 11c for a long time, and therefore the number of reactions between the organic substance in the water to be treated 4 and the oxidizing particles increases such that decomposition of the organic substance progresses (long stay effect).

Further, some of the water to be treated 4 that flows down over the plate electrode 2 is formed into the droplets 13a, 13b, 13c by the ultrasonic transducers 12a, 12b, 12c, and therefore, in comparison with a case where the water to be treated 4 flows in the form of a water film, a surface area of a gas-liquid interface increases greatly. Hence, a proportion of the water to be treated 4 that comes into contact with the discharges 11a, 11b, 11c increases such that the oxidizing particles generated by electrical discharge react with a larger proportion of an organic substance R on the surface of the water to be treated 4, and as a result, decomposition of the organic substance progresses. In other words, by forming the droplets 13a, 13b, 13c, the reaction of Equation (5) can be generated a larger number of times (wide gas-liquid interface area effect).

Furthermore, when, as a result of the reaction of Equation (5), the organic substance near the gas-liquid interface of the droplets 13a, 13b, 13c is decomposed such that the concentration thereof decreases, the frequency of the reaction of Equation (5) also decreases. In the first embodiment, however, the droplets 13a, 13b, 13c formed by the ultrasonic transducers 12a, 12b, 12c quickly drop down onto the water film 70 of the water to be treated 4 so as to coalesce therewith, and are then formed into new droplets. Therefore, formation and coalescence of the droplets 13a, 13b, 13c occurs repeatedly at a high frequency. When the droplets 13a, 13b, 13c are formed anew in this manner, molecules near the gas-liquid interface are exchanged such that new molecules of the organic substance appear. As a result, the reaction of Equation (5) occurs continuously such that decomposition of the organic substance progresses (molecular exchange effect).

Moreover, the $O_3$ and $H_2O_2$ generated by the discharges 11a, 11b, 11c and existing in the gas layer 71 dissolve from the surfaces of the droplets 13a, 13b, 13c in accordance with the reactions of Equations (6) and (7), and are transported to the water film 70 as the droplets 13a, 13b, 13c drop down. As a result, the decomposition reaction applied to the organic substance in the water film 70 in accordance with Equation (9) occurs a larger number of times than in a case where the droplets 13a, 13b, 13c are not formed ($O_3$, $H_2O_2$ transportation effect).

Further, the $O_3$ and $H_2O_2$ transported to the water film 70 by the $O_3$, $H_2O_2$ transportation effect are distributed through the water film 70 at uniform concentrations due to an agitation action occurring as the water to be treated 4 flows down over the plate electrode 2, thereby promoting the decomposition reaction applied to the organic substance in the water film 70 in accordance with Equation (9). In other words, although positions of the ultrasonic transducers 12a, 12b, 12c are fixed, the water to be treated 4 flows over the plate electrode 2, and therefore regions of the water film 70 in which the droplets 13a, 13b, 13c are formed and regions in which the droplets 13a, 13b, 13c drop down vary over time.

By comparison, when droplets are formed in standing water, the positions in which the droplets 13a, 13b, 13c are formed and drop down do not vary over time. As a result, the dissolved $O_3$ and $H_2O_2$ exist locally within the water to be treated 4, and therefore the water treatment progresses only locally.

According to the first embodiment, on the other hand, the regions of the water film 70 in which the droplets 13 are formed and drop down vary over time, and therefore the $O_3$ and $H_2O_2$ transported by the droplets 13a, 13b, 13c are distributed more evenly through the water to be treated 4. In other words, intermixing of the $O_3$ and the $H_2O_2$ is promoted by a synergistic effect between formation of the droplets 13a, 13b, 13c and the downward flow of the water to be treated 4 over the plate electrode 2. As a result, the water treatment shown in Equation (9) progresses in all regions of the water to be treated 4 (intermixing promotion effect).

According to the first embodiment, due to the five effects described above (the long stay effect, the wide gas-liquid interface area effect, the molecule exchange effect, the $O_3$, $H_2O_2$ transportation effect, and the intermixing promotion effect), water treatment can be performed without circulating the water to be treated numerous times or making the discharge power extremely high, as in PTL 1, for example. Further, the water treatment can be performed more efficiently and more quickly than in PTL 2. These effects are obtained in a similar manner when a persistent substance is decomposed.

Note that in the first embodiment, the ultrasonic transducers 12a, 12b, 12c form the droplets 13a, 13b, 13c by exerting power on the water to be treated 4. Therefore, in contrast to a case where a nozzle or a shower head is used to form droplets, the droplets are formed without passing the water to be treated 4 through extremely narrow holes. Accordingly, blockages caused by contaminants in the water to be treated 4 do not occur in the droplet forming apparatus, and as a result, maintenance is required less frequently, meaning that the apparatus can be operated at a high utilization rate.

Furthermore, in the first embodiment, as shown in FIG. 1, the ultrasonic transducers 12a, 12b, 12c are disposed on the rear side of the plate electrode 2 in the parts opposing the wire electrodes 6a, 6b, 6c. Hence, the droplets 13a, 13b, 13c move in a direction traversing the wire electrodes 6a, 6b, 6c so that more of the droplets 13a, 13b, 13c collide with the wire electrodes 6a, 6b, 6c than when droplets are ejected in an identical direction to a length direction of the wire electrodes. Accordingly, a cooling effect for cooling the wire electrodes 6a, 6b, 6c is obtained so that an increase in the temperature of the wire electrodes 6a, 6b, 6c can be suppressed even when high discharge power is introduced. As a result, discharges that remain stable for a long time can be formed.

Furthermore, deterioration of the wire electrodes 6a, 6b, 6c due to a heat cycle generated when the apparatus is switched ON and OFF repeatedly can be suppressed, enabling a reduction in the frequency with which the wire electrodes 6a, 6b, 6c must be replaced. Moreover, in the first embodiment, the ultrasonic transducers 12a, 12b, 12c form the water to be treated 4 into droplets by exerting power thereon, and therefore a large number of droplets can be formed. Further, by adjusting at least one of a voltage and a frequency of the high frequency power supply 14, the number of formed droplets, a diameter of the droplets, and a height to which the droplets shoot up can be adjusted, and in so doing, the water treatment can be optimized in accordance with the water quality of the water to be treated 4.

Furthermore, in the first embodiment, the wire electrodes 6a, 6b, 6c and the ultrasonic transducers 12a, 12b, 12c are disposed in three sets on the plate electrode 2, enabling a further improvement in a water treatment capacity.

Moreover, by adjusting at least one of a tilt angle of the plate electrode 2, a flow rate of the water to be treated 4, and the discharge power of the discharges 11a, 11b, 11c in accordance with a composition of the water to be treated 4, the water treatment can be performed under optimum conditions in accordance with the composition of the water to be treated 4 (this applies likewise in the following embodiments).

Here, the efficiency of the water treatment improves as a droplet formation rate of the water to be treated 4 increases, but reaches saturation at or above a certain droplet formation rate. The reason for this is thought to be that as the number of droplets increases, a consumption speed of the oxidizing particles increases, while the speed of the water treatment is limited by the speed at which the oxidizing particles are generated through discharge.

On the other hand, the amount of generated oxidizing particles increases as the discharge power increases, and therefore the effect is unlikely to reach saturation even when the number of droplets increases. Droplet formation requires energy, and therefore excessive droplet formation leads to a reduction in total energy efficiency. Hence, the rate of droplet formation is preferably regulated in accordance with conditions such as the composition of the water to be treated 4 and the discharge power.

Note that in the first embodiment, the pulse power supply 7 is used to form the discharges, but the power supply applied to this invention may be any power supply capable of forming a discharge with stability, and does not necessarily have to be a pulse power supply. For example, an alternating current power supply or a direct current power supply may be used instead.

Further, a polarity of the voltage output from the pulse power supply 7, a voltage wave height value, a repetition frequency, a pulse width, and so on may be determined appropriately in accordance with conditions such as the electrode structure and the gas type. Typically, the voltage wave height value is preferably set between 1 kV and 50 kV. The reason for this is that at or below 1 kV, a stable discharge cannot be formed, while at or above 50 kV, increases in the size of the power supply and the complexity of electrical insulation lead to a dramatic cost increase.

Furthermore, the repetition frequency is preferably no lower than 10 pps (pulses per second) and no higher than 100 kpps. The reason for this is that below 10 pps, an extremely high voltage is required in order to introduce sufficient discharge power, while conversely, above 100 kpps, the water treatment effect reaches saturation, leading to reduction in power efficiency. The voltage, the pulse width, and the pulse repetition frequency may also be adjusted in accordance with at least one of the flow rate of the water to be treated 4 and the composition of the substance to be treated.

Further, the plate electrode 2 may be formed from a conductive material. More specifically, a metallic material exhibiting superior corrosion resistance, such as stainless steel or titanium, is preferably used.

Furthermore, the upper surface of the plate electrode 2 may be covered by a dielectric such as glass or ceramic. In so doing, effects such as suppressing corrosion, suppressing arc discharge, and suppressing metal contamination are obtained.

Moreover, a metallic material exhibiting superior corrosion resistance, such as stainless steel or titanium, is likewise preferably used for the wire electrodes 6a, 6b, 6c, although other conductive materials may be used instead. Furthermore, the surfaces of the wire electrodes 6a, 6b, 6c may be covered by a dielectric such as glass or ceramic.

Further, in the first embodiment, the wire electrodes 6a, 6b, 6c are used as discharge forming bodies, but the discharge forming bodies do not necessarily have to take the form of wires. Rods, needles, mesh, screws, ribbons, punching metal, and so on, for example, may also be used as the discharge forming bodies. Note, however, that in order to form a stable discharge at a comparatively low voltage, the discharge forming bodies are more preferably formed in the shape of wires, needles, mesh, screws, or ribbons, in which electrical field concentration occurs, than in a plate shape.

Furthermore, in the first embodiment, a high oxygen concentration atmosphere is formed in the interior of the treatment tank 1 by supplying oxygen gas from the gas supply source 17, but the gas type is not limited to oxygen, and as long as the gas contains oxygen, the reactions of Equations (1) to (9) occur so that the water treatment can be performed. For example, nitrogen or an inert gas may be mixed into the oxygen in a desired proportion. Particularly when an inert gas is used, a discharge can be formed with stability even at a comparatively low voltage, and therefore, by using air, the cost of the gas can be greatly reduced.

Moreover, the flow rate of the supplied gas does not have to be constant, and may be adjusted as appropriate in accordance with the composition of the water to be treated 4, discharge conditions, and so on. For example, when the organic substance concentration of the water to be treated 4 is high, a large amount of oxygen is consumed in the oxidative decomposition process, and therefore the flow rate of the supplied gas is preferably increased. When the organic substance concentration of the water to be treated 4 is low, on the other hand, the ozone concentration of the supplied gas can be increased by reducing the flow rate of the gas, leading to an increase in the speed of the reactions.

Furthermore, the gas flow rate may be increased when the apparatus is activated so that the air in the interior of the apparatus is replaced quickly, and then reduced to the flow rate required for the water treatment. In so doing, the amount of used gas can be suppressed and the water treatment can be performed at high speed.

Further, the gas that is discharged through the gas discharge port 1b may be recirculated to the gas supply port 1d. In so doing, the amount of gas supplied from the gas supply source 17 can be reduced. Additionally, the $O_3$ and $H_2O_2$ generated during discharge may be returned to the treatment tank 1 instead of being discharged to the outside, and in so doing, the $O_3$ and $H_2O_2$ can be used efficiently.

Moreover, in the first embodiment, the three wire electrodes 6a, 6b, 6c are used, but the number of discharge forming bodies may be modified as appropriate in accordance with the dimensions of the plate electrode 2, the composition of the water to be treated 4, the treatment flow rate, and so on.

Furthermore, a distance (an inter-electrode distance) between the wire electrodes 6a, 6b, 6c and the plate electrode 2 is preferably no smaller than 1 mm and no larger than 50 mm. The reason for this is that when the inter-electrode distance is smaller than 1 mm, the wire electrodes 6a, 6b, 6c are more likely to be submerged in the flowing water to be treated 4, whereas when the inter-electrode distance is larger than 50 mm, an extremely high voltage is required to form a discharge.

Further, as long as the droplets 13a, 13b, 13c can be formed in the vicinity of the discharges 11a, 11b, 11c, a positional relationship between the wire electrodes 6a, 6b, 6c and the ultrasonic transducers 12a, 12b, 12c is not necessarily limited to the positional relationship shown in FIG. 1. For example, the wire electrodes 6a, 6b, 6c may be disposed in positions corresponding to an antinode of a standing wave formed in the water to be treated 4 by ultrasonic vibration. Furthermore, the ultrasonic transducers 12a, 12b, 12c may contact the water to be treated 4 directly. For example, a plurality of through holes may be provided in the plate electrode 2, and the ultrasonic transducers 12a, 12b, 12c may be disposed in the through holes. Alternatively, the ultrasonic transducers 12a, 12b, 12c may be disposed on the upper surface of the plate electrode 2.

Moreover, an internal pressure of the treatment tank 1 is preferably set at atmospheric pressure or the vicinity thereof so that the water to be treated 4 can be supplied and discharged easily. However, the internal pressure of the treatment tank 1 may also be set at a positive pressure or a negative pressure as required. When the internal pressure of the treatment tank 1 is positive, intermixing of outside air is suppressed, thereby facilitating management of the atmosphere in the treatment tank 1. Further, when the internal pressure of the treatment tank 1 is negative, the discharges 11a, 11b, 11c can be formed at a comparatively low voltage, enabling reductions in the size and complexity o f the power supply. Moreover, the discharges 11a, 11b, 11c spread more easily as the pressure decreases, allowing the water to be treated 4 to contact the discharges 11a, 11b, 11c over a wide area, and as a result, improvements in the speed and efficiency of the water treatment are achieved.

Furthermore, in FIGS. 1 and 2, respective upper sides of the wire electrodes 6a, 6b, 6c may be covered by a cover. In so doing, the region in which the water to be treated 4 flows down is formed as an enclosed space, and as a result, the droplets 13a, 13b, 13c can be prevented from diffusing to the outside of the flow path.

Second Embodiment

Figure 5:
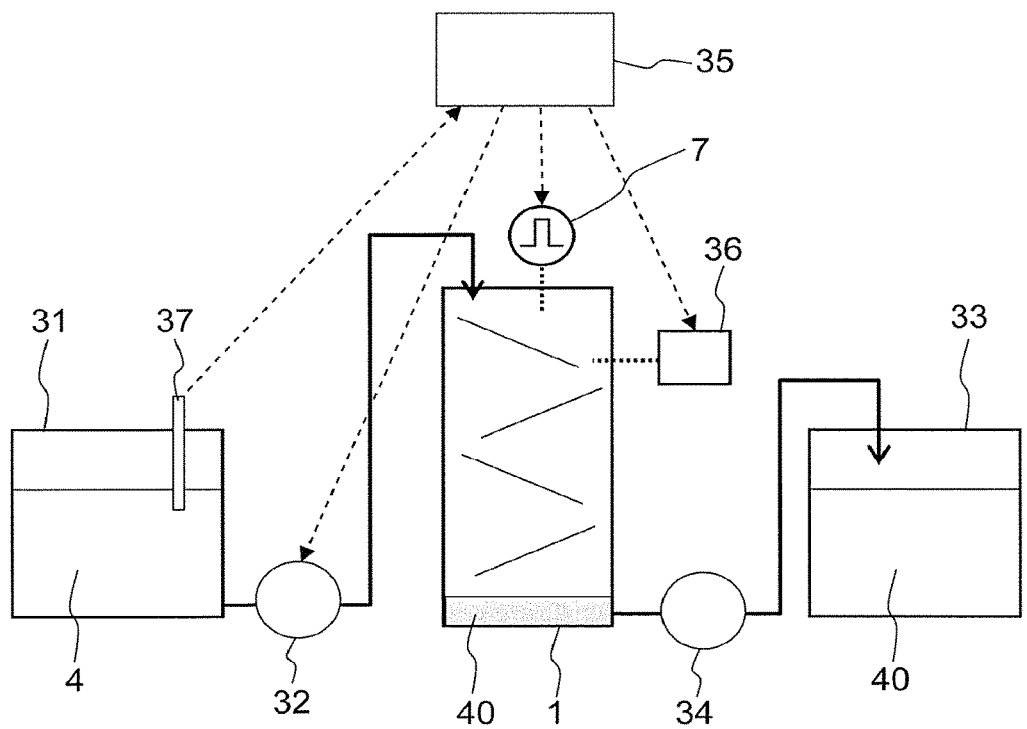
FIG. 5 is a view showing a configuration of a water treatment apparatus according to a second embodiment of this invention.

FIG. 5 is a view showing a configuration of a water treatment apparatus according to a second embodiment of this invention. In the drawing, the water to be treated 4 is stored in a treatment water tank 31. The treatment water tank 31 is connected to an uppermost portion of the treatment tank 1 via a metering liquid pump 32. The water to be treated 4 in the treatment water tank 31 is delivered to the uppermost portion of the treatment tank 1 from a lower portion of the treatment water tank 31 by the metering liquid pump 32.

A treated water tank 33 that stores treated water 40 is connected to a bottom portion of the treatment tank 1 via a drainage pump 34. The treated water 40 that drops to the bottom portion of the treatment tank 1 is delivered to the treated water tank 33 by the drainage pump 34.

A centralized control unit 35, the pulse power supply 7, and an angle control unit 36 are provided on the outside of the treatment tank 1. A water quality meter 37 that detects a water quality (the composition) of the water to be treated 4 is provided in the treatment water tank 31. The water quality meter 37 detects a biochemical oxygen demand (BOD), a chemical oxygen demand (COD), organic substance components, and so on of the water to be treated 4.

A signal from the water quality meter 37 is input into the centralized control unit 35. The centralized control unit 35 controls the pulse power supply 7, the metered liquid pump 32, the drainage pump 34, and the angle control unit 36.

Figure 6:
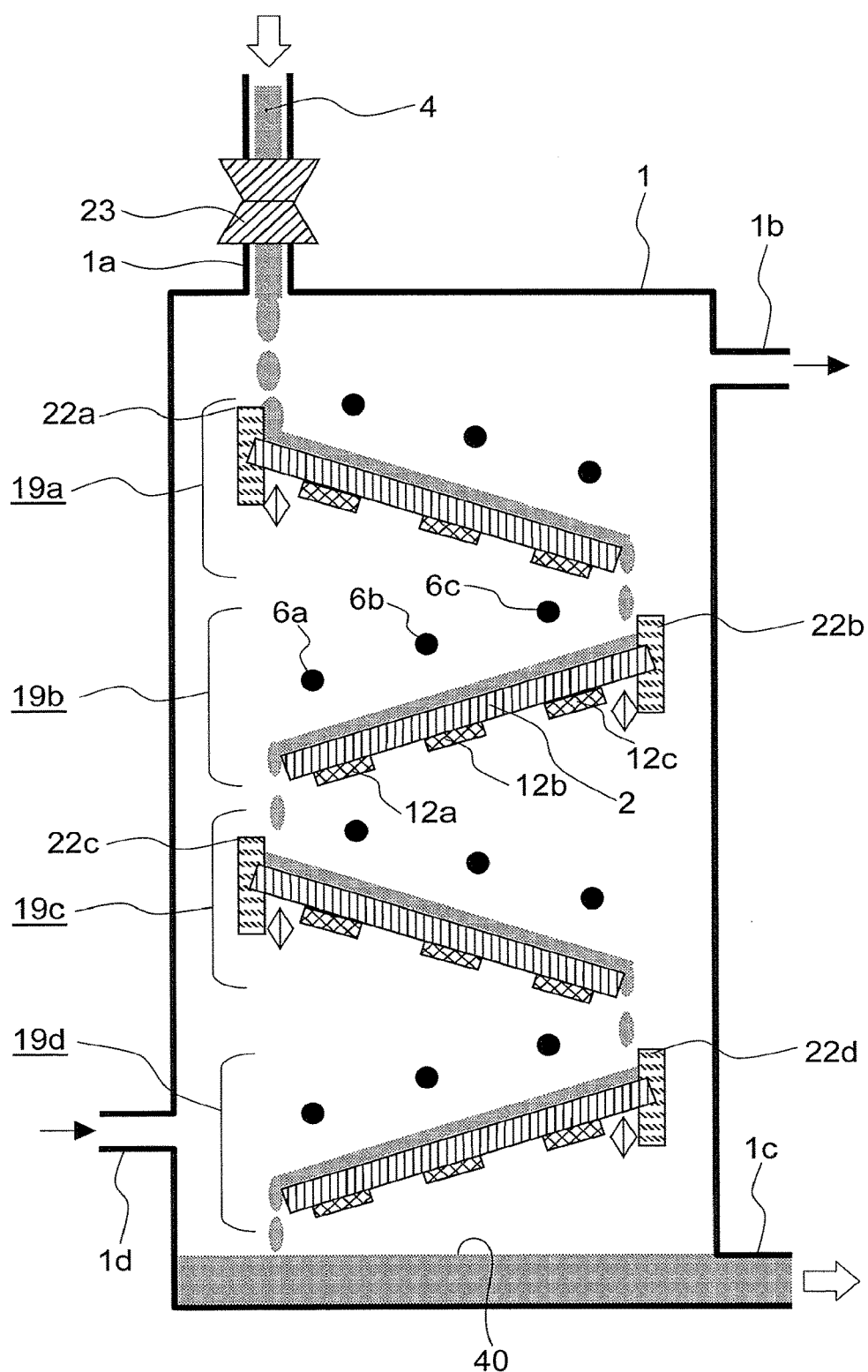
FIG. 6 is an enlarged sectional view of a treatment tank shown in FIG. 5.

FIG. 6 is an enlarged sectional view of the treatment tank 1 shown in FIG. 5. The treatment tank 1 is provided with the water feed port 1a, the gas discharge port 1b, the water discharge port 1c, and the gas supply port 1d. A water amount regulation mechanism 23 is provided in the water feed port 1a.

A plurality of (here, four) water treatment units 19a, 19b, 19c, 19d are disposed in the treatment tank 1 and arranged in multiple stages in a vertical direction. Similarly to the water treatment unit 19 of the first embodiment, the water treatment units 19a, 19b, 19c, 19d each include the plate electrode 2, the wire electrodes 6a, 6b, 6c, and the ultrasonic transducers 12a, 12b, 12c.

Further, the plate electrodes 2 of the respective water treatment units 19a, 19b, 19c, 19d are tilted in alternating opposite directions relative to the horizontal plane so that the water to be treated 4 flows continuously downward (in a zigzag shape) from the uppermost water treatment unit 19a to the lowermost water treatment unit 19d. In other words, in the water treatment units 19a, 19b, 19c, 19d provided adjacent to each other in the vertical direction, the plate electrodes 2 are disposed in opposite inclined directions relative to the horizontal plane.

The water to be treated 4 is supplied to the treatment tank 1 through the water feed port 1a, and is treated while passing through the water treatment units 19a, 19b, 19c, 19d in succession. The treated water 40 that has passed through the lowermost water treatment unit 19d drops to the bottom of the treatment tank 1, and is then discharged to the outside of the treatment tank 1 through the water discharge port 1c.

Further, the wire electrodes 6a, 6b, 6c of the respective water treatment units 19a, 19b, 19c, 19d are all electrically connected in parallel to the pulse power supply 7. Moreover, the plate electrodes 2 are all electrically grounded.

Furthermore, angle adjustment mechanisms 22a, 22b, 22c, 22d are provided respectively in the water treatment units 19a, 19b, 19c, 19d to adjust the tilt angle of the corresponding water treatment unit 19a, 19b, 19c, 19d. The angle adjustment mechanisms 22a, 22b, 22c, 22d are connected to the angle control unit 36 (FIG. 5). All other configurations are similar or identical to the first embodiment.

Next, an operation will be described. The water to be treated 4 in the treatment water tank 31 is taken in by the metering liquid pump 32 and supplied to the treatment tank 1 through the water feed port 1a. The water to be treated 4 supplied to the treatment tank 1 flows down over the upper surface of the plate electrode 2 from an upper side end portion of the water treatment unit 19a, and then drops onto the upper side end portion of the water treatment unit 19b from a lower side end portion of the water treatment unit 19a. The water to be treated 4 then flows down through the water treatment units 19b, 19c, 19d in succession.

At this time, the discharges 11a, 11b, 11c are formed by operating the pulse power supply 7 in order to apply a high voltage to the wire electrodes 6a, 6b, 6c, and the water to be treated 4 is treated by forming droplets from the water to be treated 4 using the ultrasonic transducers 12a, 12b, 12c. The treated water 40 is delivered to the treated water tank 33 from the bottom of the treatment tank 1 by the drainage pump 34.

Meanwhile, the centralized control unit 35 controls the metering liquid pump 32, the drainage pump 34, the angle control unit 36, and the pulse power supply 7 on the basis of information from the water quality meter 37, or in other words in accordance with the water quality of the water to be treated 4.

For example, when the organic substance concentration of the water to be treated 4 is high or when the treatment subject is a persistent substance, respective feed rates of the metering liquid pump 32 and the drainage pump 34 are set to be low, while the tilt angles of the water treatment units 19a, 19b, 19c, 19d, or in other words the tilt angles of the respective plate electrodes 2 relative to the horizontal direction, are set to be small. As a result, the water to be treated 4 remains in the water treatment units 19a, 19b, 19c, 19d for a longtime so that the treatment subject substance is sufficiently decomposed.

Conversely, when the organic substance concentration of the water to be treated 4 is low or when the treatment subject is an easily decomposed substance, the flow rate of the water to be treated 4 is set to be high and the tilt angles of the water treatment units 19a, 19b, 19c, 19d are set to be large. As a result, the water to be treated 4 passes through the water treatment units 19a, 19b, 19c, 19d quickly so that the overall water treatment operation is performed at high speed.

Further, when the treatment subject substance concentration of the water to be treated 4 is high, the discharge power can be increased by increasing at least one of the output voltage and the pulse repetition frequency of the pulse power supply 7. Conversely, the discharge power can be reduced when the treatment subject substance concentration is low.

With the water treatment apparatus and water treatment method described above, the water treatment units 19a, 19b, 19c, 19d are disposed in multiple stages, and therefore the water to be treated 4 contacts the discharges 11a, 11b, 11c for an extended period of time. Hence, in comparison with the first embodiment, in which the water to be treated 4 passes through the treatment tank 1 only once, a superior water treatment effect is obtained. Further, the plurality of (four) water treatment units 19a, 19b, 19c, 19d are arranged in multiple stages in the vertical direction so that the water to be treated 4 flows continuously downward from the uppermost water treatment unit 19a to the lowermost water treatment unit 19d, and therefore a footprint of the treatment tank 1 can be reduced in comparison with a case where an identical treatment area is formed by a single water treatment unit. As a result, the water to be treated 4 can be treated quickly and efficiently using a comparatively small apparatus.

Further, the flow rate of the water to be treated 4, the tilt angles of the plate electrodes 2 in the respective water treatment units 19a, 19b, 19c, 19d, and the discharge power are adjusted in accordance with the water quality of the water to be treated 4, and therefore an optimum operation corresponding to the water quality or the amount of the water to be treated 4 can be performed.

Note that in the second embodiment, the four water treatment units 19a, 19b, 19c, 19d are used, but the number of water treatment units may be set as appropriate in accordance with the dimensions of the treatment tank 1, the required water treatment capacity, and so on.

Further, in the second embodiment, the metering liquid pump 32 is used to adjust the flow rate of the water to be treated 4, but this invention is not limited thereto, and a mass flow controller or the like, for example, may be used instead.

Furthermore, the respective water treatment units 19a, 19b, 19c, 19d may be configured differently to each other. For example, the tilt angle of the first electrode, the distance between the discharge forming body and the tilted plate, the number, type, and shape of the discharge forming body, the number, type, and position of the droplet forming apparatus, the discharge power, and so on may be set differently in the respective water treatment units.

Moreover, treatment of the water to be treated 4 progresses as the water to be treated 4 advances downstream, and therefore, by reducing the discharge power in the water treatment units positioned on the downstream side, for example, ineffective power consumption can be suppressed.

Further, each water treatment unit may be provided with a switch for stopping discharge in the water treatment units positioned on the downstream side when the treatment subject substance concentration of the water to be treated 4 is low or when the subject substance is easily discomposed. In so doing, ineffective power consumption can be suppressed.

Furthermore, in the example described above, the tilt angle of the plate electrode 2, the flow rate of the water to be treated 4, and the discharge power are adjustable, but instead, only one or two of these elements may be made adjustable.

Third Embodiment

Figure 7:
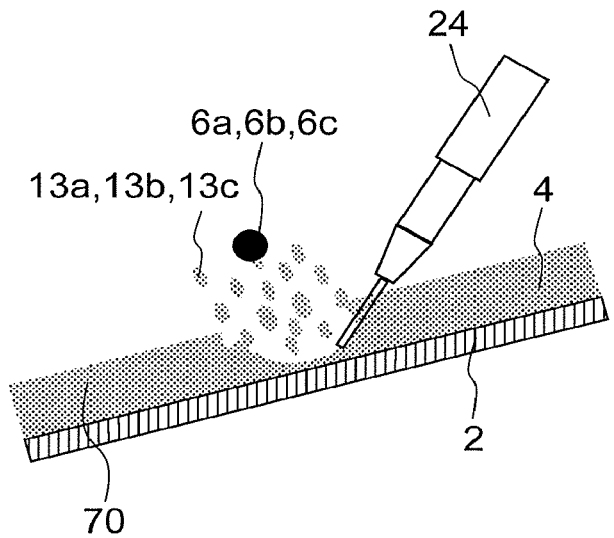
FIG. 7 is a sectional view showing main parts of a water treatment apparatus according to a third embodiment of this invention.

FIG. 7 is a sectional view showing main parts of a water treatment apparatus according to a third embodiment of this invention. In the third embodiment, a plurality of ultrasonic homogenizers 24 (only one of which is shown in FIG. 7) are used as the droplet forming apparatus. The ultrasonic homogenizers 24 are disposed in alignment with the wire electrodes 6a, 6b, 6c.

In this example, the ultrasonic homogenizers 24 are disposed above the plate electrode 2. Respective tip end portions of the ultrasonic homogenizers 24 contact the water to be treated 4 in the vicinity of the wire electrodes 6a, 6b, 6c, or in other words in the regions where the discharges 11a, 11b, 11c are formed.

The ultrasonic homogenizers 24 are connected to the high frequency power supply 14 (FIG. 1). When the high frequency power supply 14 is operated to drive the ultrasonic homogenizers 24, power is exerted on the water to be treated 4, causing at least some of the water to be treated 4 to shoot upward and form droplets. All other configurations are similar or identical to the first or second embodiment.

With the water treatment apparatus and water treatment method described above, the ultrasonic homogenizers 24 are used as the droplet forming apparatus, and therefore the water to be treated 4 can be formed into droplets locally in the regions where the discharges 11a, 11b, 11c are formed. As a result, the droplets 13a, 13b, 13c can be formed efficiently.

Further, in the third embodiment, the droplets 13a, 13b, 13c are formed by exerting power on the water to be treated 4 using the ultrasonic homogenizers 24. Therefore, in contrast to a case where a nozzle or a shower head is used to form droplets, the droplets are formed without passing the water to be treated 4 through extremely narrow holes. Accordingly, blockages caused by contaminants in the water to be treated 4 do not occur in the droplet forming apparatus, and as a result, maintenance is required less frequently, meaning that the apparatus can be operated at a high utilization rate.

Figure 8:
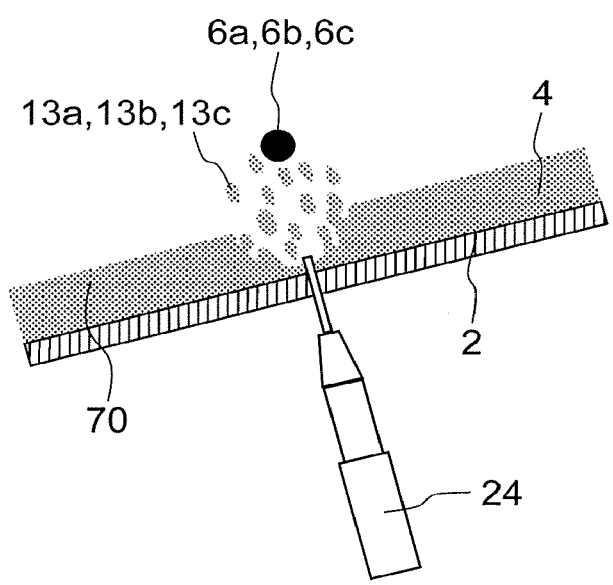
FIG. 8 is a sectional view showing a modified example in which an ultrasonic homogenizer shown in FIG. 7 is disposed on a lower side of a plate electrode.

Note that in the example described above, the ultrasonic homogenizer 24 is disposed on the upper side of the plate electrode 2, but as shown in FIG. 8, the ultrasonic homogenizer 24 may be disposed on the lower side of the plate electrode 2. In FIG. 8, the tip end portion of the ultrasonic homogenizer 24 penetrates the plate electrode 2 so as to contact the water to be treated 4.

Further, the number of ultrasonic homogenizers 24 may be determined as desired. For example, pluralities of ultrasonic homogenizers 24 may be disposed respectively at right angle directions (right angle directions on the paper surface of FIGS. 7 and 8) to the flow of the water to be treated 4 flowing down over the plate electrode 2. In this case, the water to be treated 4 can be formed into droplets evenly over a wide region extending in the length direction of the wire electrodes 6a, 6b, 6c (the width direction of the plate electrode 2), and as a result, the water treatment can be performed efficiently.

Furthermore, a shape of the tip end portion (a water contact portion) of the ultrasonic homogenizer 24 may be determined as desired. For example by reducing the thickness of the water contact portion, the droplets 13a, 13b, 13c can be formed locally using a small amount of power. Conversely, by increasing the thickness of the water contact portion, the droplets 13a, 13b, 13c can be formed over a comparatively wide region. Hence, the shape of the water contact portion may be selected as appropriate in accordance with the inter-electrode distance, the flow rate of the water to be treated 4, and so on.

Moreover, a casing of the ultrasonic homogenizer 24 is preferably either grounded or covered by an insulator. Furthermore, an isolation transformer may be connected between the high frequency power supply 14 and the ultrasonic homogenizer 24. In so doing, the ultrasonic homogenizer 24 and the high frequency power supply 14 can be prevented from damage caused by the high voltage pulse applied to the wire electrodes 6a, 6b, 6c.

Fourth Embodiment

Figure 9:
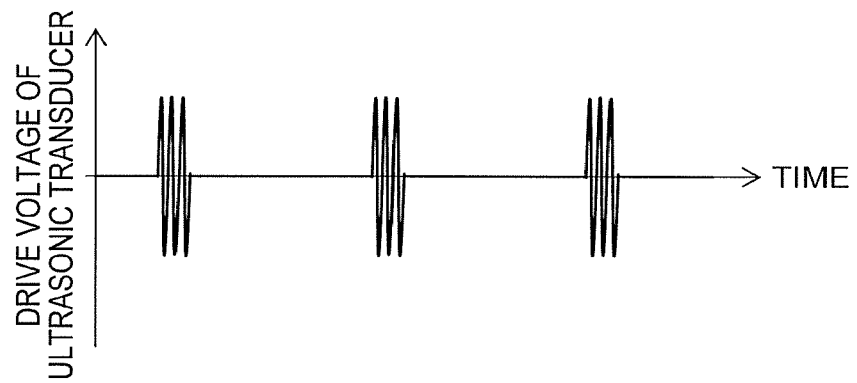
FIG. 9 is a waveform diagram showing a drive voltage signal from an ultrasonic transducer of a water treatment apparatus according to a fourth embodiment of this invention.

FIG. 9 is a waveform diagram showing a drive voltage signal from the ultrasonic transducers 12a, 12b, 12c of a water treatment apparatus according to a fourth embodiment of this invention. The fourth embodiment differs from the first embodiment in that the ultrasonic transducers (PZT ultrasonic transducers) 12a, 12b, 12c are driven intermittently. In this embodiment, droplet generation is performed intermittently by applying a high frequency voltage intermittently.

Figure 10:
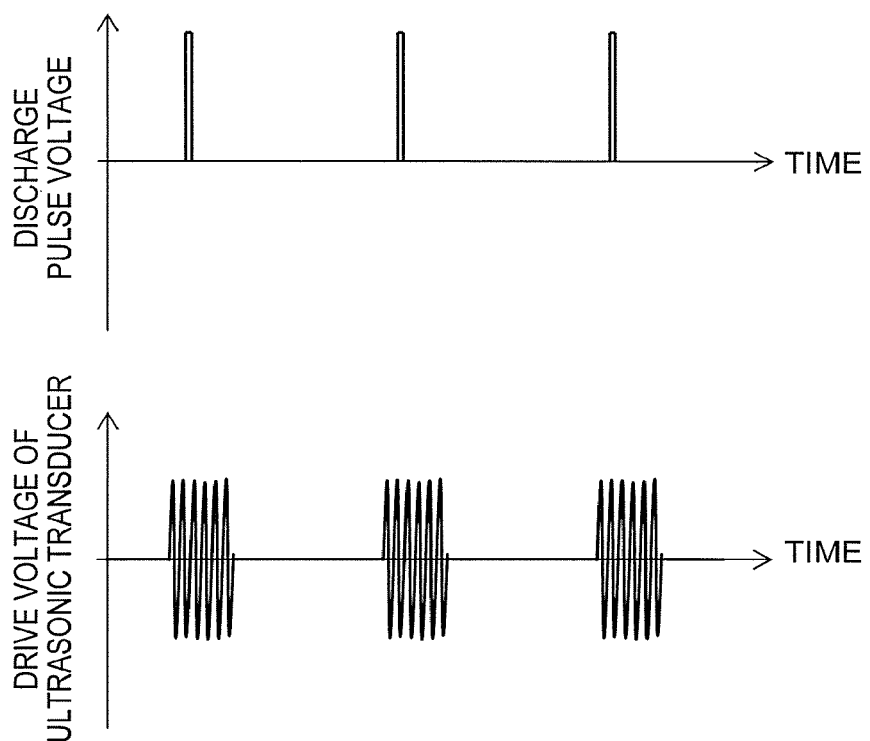
FIG. 10 is a waveform diagram showing a comparison between the drive voltage signal from the ultrasonic transducer and a discharge pulse voltage signal applied to a wire electrode in the water treatment apparatus according to the fourth embodiment.

Further, FIG. 10 is a waveform diagram showing a comparison between the drive voltage signal from the ultrasonic transducers 12a, 12b, 12c and a discharge pulse voltage signal applied to the wire electrodes 6a, 6b, 6c in the water treatment apparatus according to the fourth embodiment. In the fourth embodiment, an ultrasonic transducer drive signal is applied in synchronization with a discharge generation pulse voltage output by the pulse power supply (FIG. 1). As a result, droplet generation is performed intermittently in synchronization with discharge. All other configurations are similar or identical to the first or second embodiment.

With the water treatment apparatus and water treatment method according to this invention, improvements are achieved in the efficiency and speed of the water treatment by forming droplets from at least some of the water to be treated 4. Droplet formation does not necessarily have to be performed continuously, however, and similar effects are obtained when droplet formation is performed intermittently.

The efficiency and speed of the water treatment typically improve when a duty ratio of ultrasonic transducer driving is increased, but at or above a certain duty ratio, the effect tends to reach saturation. The reason for this is thought to be that when a large number of droplets are formed, the water treatment speed is limited by the number of oxidizing particles, such as O, OH, $O_3$, and $H_2O_2$, generated through discharge to a greater extent than by the number of droplets.

Hence, by driving the ultrasonic transducers 12a, 12b, 12c intermittently, as shown in FIG. 9, ineffective power consumption can be suppressed, and as a result, the water treatment can be performed efficiently.

Further, the lifespan of OH radicals that are effective in decomposing persistent substances is typically no more than one millisecond, i.e. extremely short, and once discharge is stopped and the OH radicals dissipate, a favorable decomposition effect is not obtained even by forming droplets from the water to be treated 4. Hence, by performing the droplet formation operation intermittently in synchronization with pulse discharge, i.e. only in a period during which OH radicals exist, as shown in FIG. 10, ineffective energy consumption can be suppressed, and as a result, the water treatment can be performed efficiently.

Therefore, by operating the ultrasonic transducers 12a, 12b, 12c intermittently in the water treatment apparatus and water treatment method according to the fourth embodiment, ineffective energy consumption can be suppressed in comparison with a case where the ultrasonic transducers 12a, 12b, 12c are operated continuously, and as a result, the water treatment can be performed efficiently.

Further, by driving the ultrasonic transducers 12a, 12b, 12c in synchronization with pulse discharge, OH radicals can be used effectively such that ineffective energy consumption can be suppressed.

Note that when driving of the ultrasonic transducers 12a, 12b, 12c is synchronized with pulse discharge, a time delay between the start of driving of the ultrasonic transducers 12a, 12b, 12c and droplet formation must be taken into account. Causes of the time delay include a time required for ultrasonic wave transmission, a time from water film vibration to droplet formation, and so on. In consideration of these factors, the ultrasonic transducers are preferably driven before starting to apply a pulse voltage.

Further, the method of driving the ultrasonic transducers 12a, 12b, 12c described in the fourth embodiment may be applied likewise to a droplet forming apparatus other than the ultrasonic transducers 12a, 12b, 12c, for example the ultrasonic homogenizers 24 described in the third embodiment.

Fifth Embodiment

Figure 11:
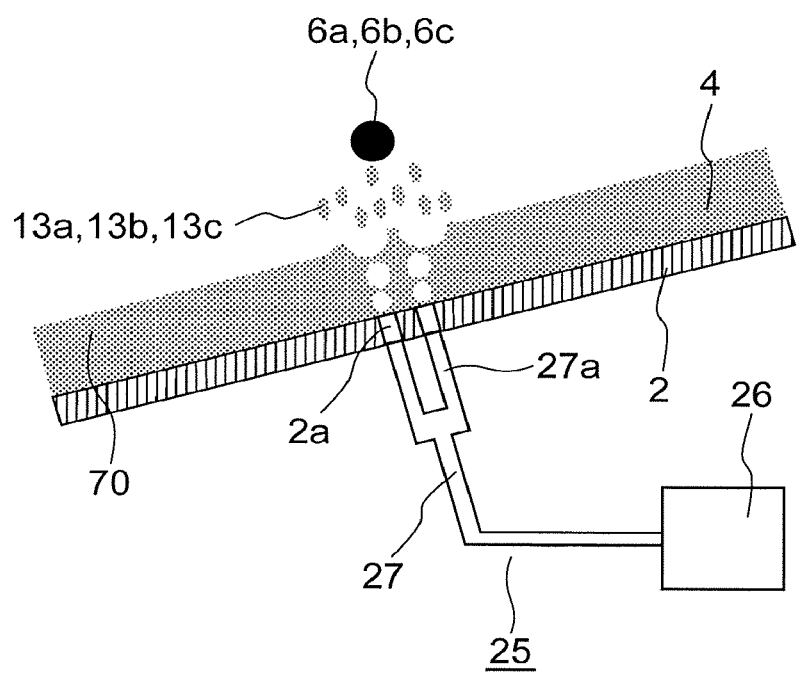
FIG. 11 is a sectional view showing main parts of a water treatment apparatus according to a fifth embodiment of this invention.

FIG. 11 is a sectional view showing main parts of a water treatment apparatus according to a fifth embodiment of this invention. In the fifth embodiment, a plurality of gas ejection apparatuses 25 (only one of which is shown in FIG. 11) are used as the droplet forming apparatus. Each gas ejection apparatus 25 includes a gas source 26 and a gas pipe 27 connected to the gas source 26. A tip end of the gas pipe 27 bifurcates into a plurality of nozzle portions 27a.

A plurality of narrow holes 2a are provided in the plate electrode 2 in the vicinity of the wire electrodes 6a, 6b, 6c, or in other words the regions of the plate electrode 2 in which the discharges 11a, 11b, 11c are formed. Respective tip ends of the nozzle portions 27a are connected to the narrow holes 2a. When gas is ejected (discharged) into the water to be treated 4 from the gas ejection apparatus 25, power is exerted on the water to be treated 4, causing at least some of the water to be treated 4 to shoot upward and form droplets. All other configurations are similar or identical to the first or second embodiment.

Next, effects of the fifth embodiment will be described using FIGS. 12 to 17. Note that dots illustrated in the water film 70 in FIGS. 12 to 17 denote dissolved $O_3$ or $H_2O_2$, and a high density of dots indicates high concentrations of $O_3$ and $H_2O_2$. Further, FIGS. 12 to 17 show gradual change over time on the periphery of one of the narrow holes 2a.

Figure 12:
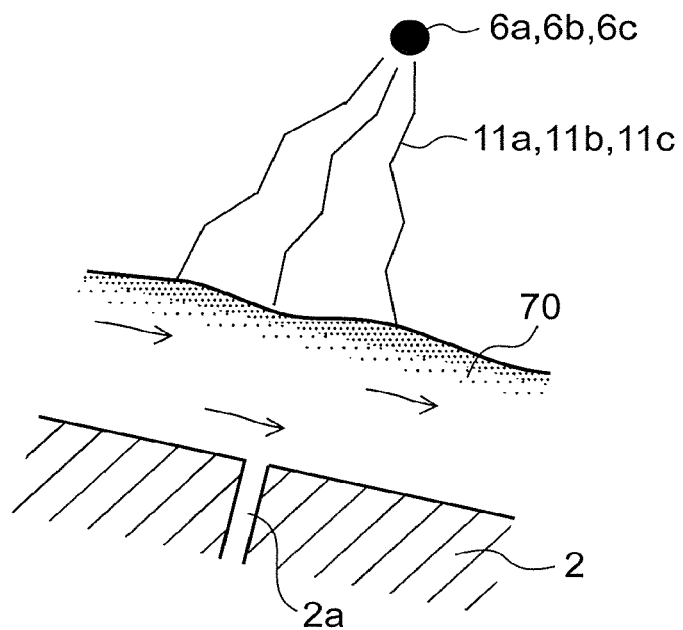
FIG. 12 is an illustrative view showing a water treatment operation performed by the water treatment apparatus shown in FIG. 11.

In FIG. 12, the $O_3$ and $H_2O_2$ generated by the discharges 11a, 11b, 11c formed between the wire electrodes 6a, 6b, 6c and the plate electrode 2 dissolve into the water to be treated 4 from the surface of the water film 70 in accordance with Equations (6) and (7). At this time, the dissolved $O_3$ and $H_2O_2$ exist at higher concentrations near the surface of the water film 70.

Figure 13:
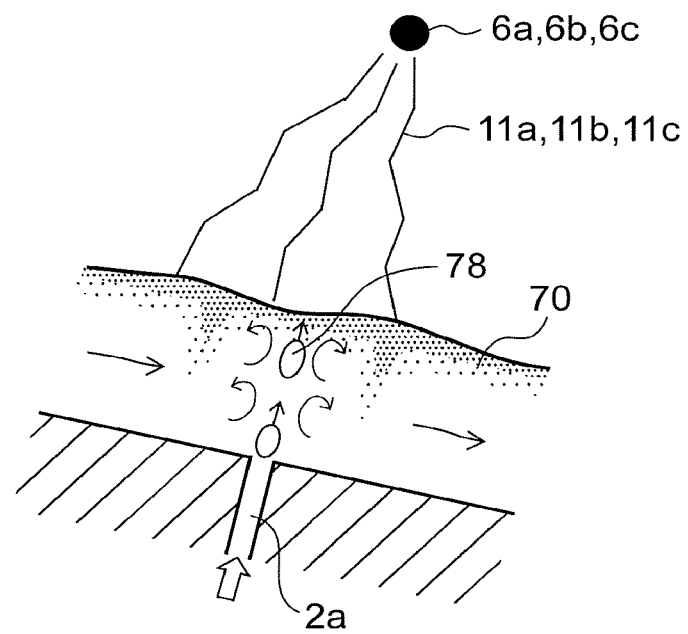
FIG. 13 is an illustrative view showing a condition in which gas is elected through a narrow hole shown in FIG. 12.

In FIG. 13, air bubbles 78 are formed in the interior of the water film 70 when gas is ejected through the narrow hole 2a, and the air bubbles 78 rise through the water film 70. During this process, a swirl indicated by arrows in the drawing is generated in the water film 70 such that the $O_3$ and $H_2O_2$ existing at higher concentrations near the surface of the water film 70 are agitated toward the deep portion of the water film 70.

Figure 14:
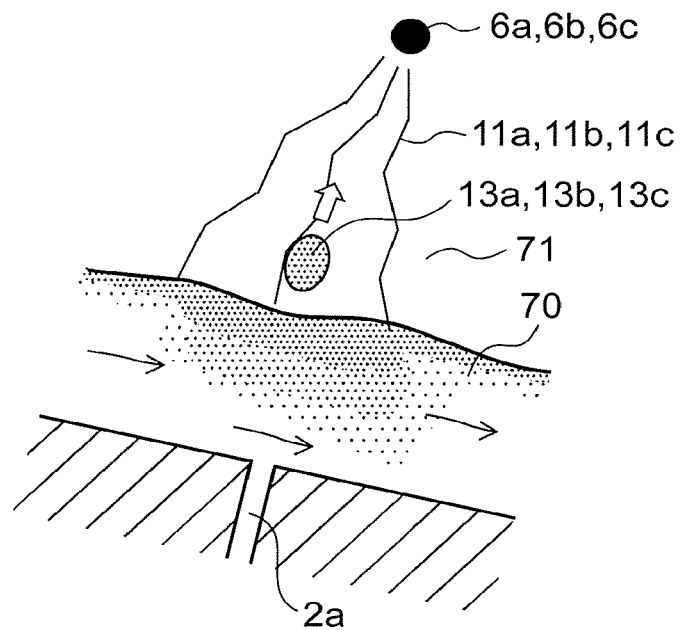
FIG. 14 is an illustrative view showing a condition in which droplets are formed on a water film shown in FIG. 13.
Figure 15:
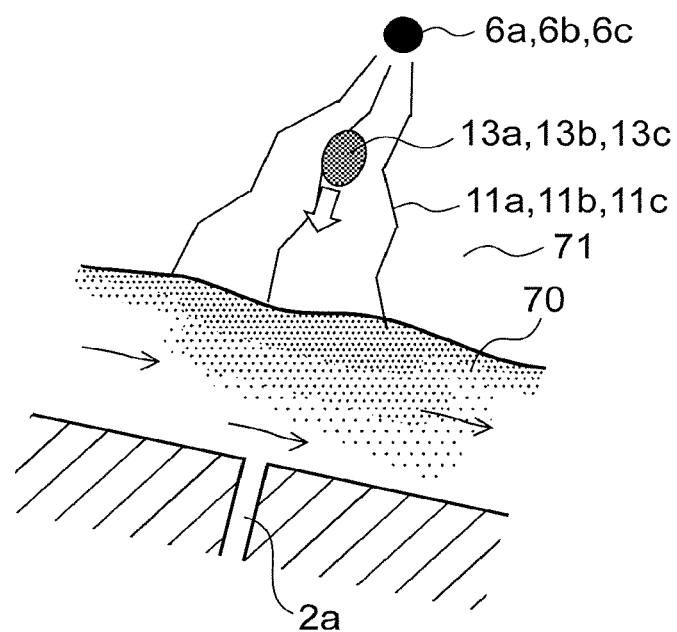
FIG. 15 is an illustrative view showing the droplets of FIG. 14 dropping down.

In FIG. 14, the droplets 13a, 13b, 13c are formed. In a rising process shown in FIG. 14 and a dropping process shown in FIG. 15, the $O_3$ and $H_2O_2$ in the gas layer 71 dissolve into the droplets 13a, 13b, 13c, leading to an increase in the concentrations of the $O_3$ and $H_2O_2$ existing in the droplets 13a, 13b, 13c.

Figure 16:
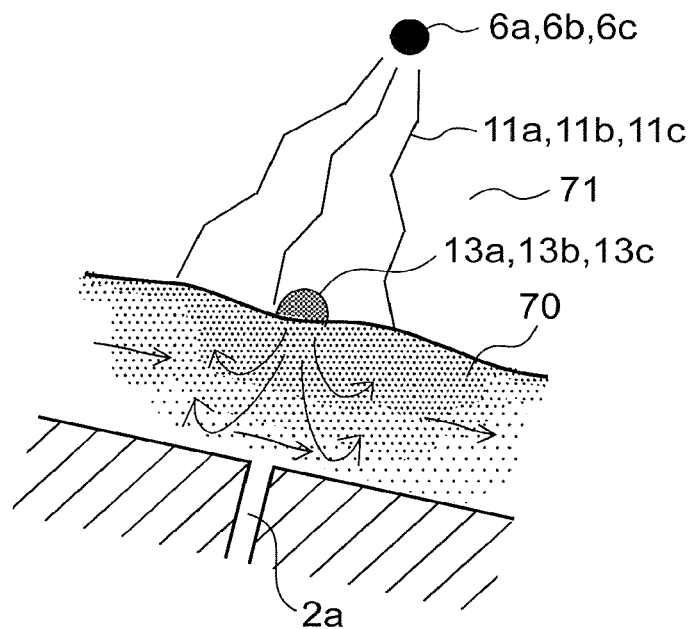
FIG. 16 is an illustrative view showing a condition in which a swirl is formed in the water film by the droplets shown in FIG. 15.

In FIG. 16, a swirl indicated by arrows is generated in the water film 70 by impacts occurring when the droplets 13a, 13b, 13c drop onto the water film 70, and as a result, the dissolved $O_3$ and $H_2O_2$ transported by the droplets 13a, 13b, 13c and the $O_3$ and $H_2O_2$ existing in the water film 70 are agitated.

Figure 17:
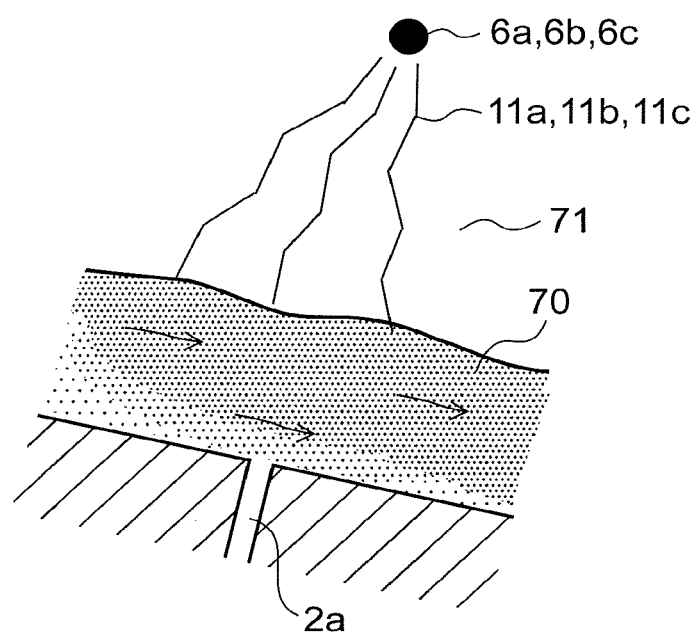
FIG. 17 is an illustrative view showing a condition in which the water film is agitated by the swirl shown in FIG. 16.

Accordingly, as shown in FIG. 17, the overall concentration of the dissolved $O_3$ and $H_2O_2$ in the water film 70 increases and becomes even. Therefore, since the water treatment generated by the reaction of Equation (9) progresses over the entire water film 70, a vast improvement in the water treatment performance is achieved in comparison with a case where the $O_3$ and $H_2O$, remain at higher concentrations near the surface of the water film 70 (in other words, the condition shown in FIG. 12).

Note that FIGS. 12 to 17 show an example in which two air bubbles 78 and a single droplet 13a, 13b, 13c exist, but in actuality, large numbers of air bubbles 78 and large numbers of droplets 13a, 13b, 13c are formed continuously, and therefore the dissolved $O_3$ and $H_2O_2$ are distributed at even concentrations through all of the water to be treated 4 flowing over the plate electrode 2.

Further, in the fifth embodiment, power is exerted on the water to be treated 4 by ejecting gas from the gas ejection apparatus 25 into the water to be treated 4, with the result that at least some of the water to be treated 4 shoots upward so as to form droplets, and therefore a large number of droplets can be formed. Moreover, by varying at least one of the flow speed of the injected gas, the shape of the narrow holes 2a, and the distribution of the narrow holes 2a, the number of formed droplets, the diameter of the droplets, the height to which the droplets shoot up, and so on can be adjusted.

Furthermore, in the fifth embodiment, the droplets 13a, 13b, 13c are formed by exerting power on the water to be treated 4 using the gas ejection apparatus 25. Therefore, in contrast to a case where a nozzle or a shower head is used to form the droplets, the droplets are formed when the gas flows through the narrow holes 2a instead of being formed by passing the water to be treated 4 through extremely narrow holes. Accordingly, blockages of the narrow holes 2a caused by contaminants in the water to be treated 4 can be suppressed, and as a result, maintenance is required less frequently, meaning that the apparatus can be operated at a high utilization rate.

With the water treatment apparatus and water treatment method described above, the droplets 13a, 13b, 13c can be formed simply by supplying gas, i.e. without the need to use electrically driven components such as the ultrasonic transducers 12a, 12b, 12c. As a result, breakdowns can be suppressed such that the water treatment can be performed continuously over a long period.

Further, when droplets are formed using the ultrasonic transducers 12a, 12b, 12c, the thickness of the water film 70 is limited by the need to generate a resonance condition, but in the fifth embodiment, the droplets 13a, 13b, 13c can be formed without limiting the thickness of the water film 70.

Note that in the fifth embodiment, the hole diameter, number, and positions of the narrow holes 2a may be set in accordance with the electrode arrangement, the film thickness of the water to be treated 4, and so on. When the number of narrow holes and the diameter of the narrow holes are reduced, for example, a surface area through which the gas passes becomes narrower, leading to an increase in the flow speed of the gas. As a result, the droplets 13a, 13b, 13c can be formed at a higher density in a small region.

Sixth Embodiment

Figure 18:
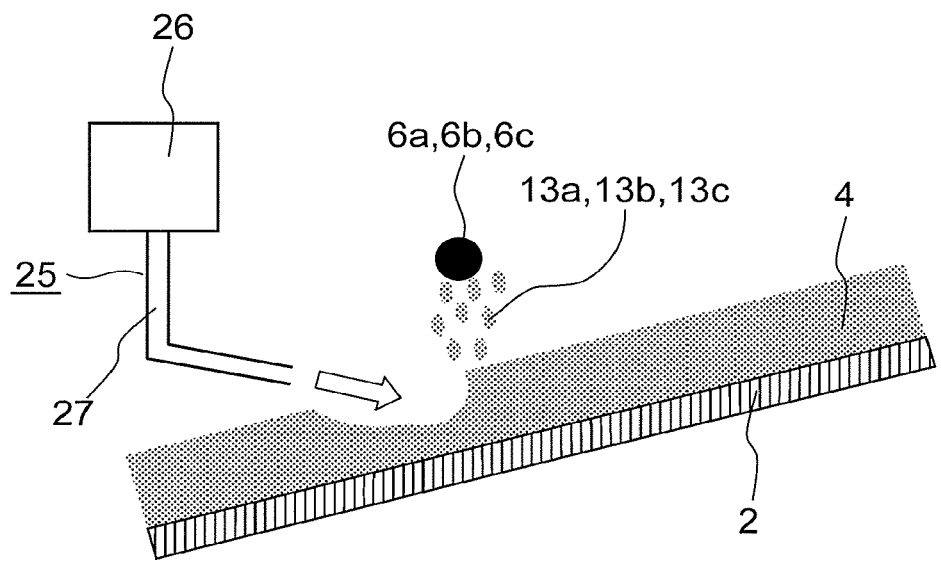
FIG. 18 is a sectional view showing main parts of a water treatment apparatus according to a sixth embodiment of this invention.

FIG. 18 is a sectional view showing main parts of a water treatment apparatus according to a sixth embodiment of this invention. The sixth embodiment differs from the fifth embodiment in that the gas used to form the droplets is supplied from above the water to be treated 4. In other words, the gas ejection apparatus 25 according to the sixth embodiment is disposed so as to spray the water to be treated 4 flowing over the upper surface of the plate electrode 2 with the gas from an upwardly removed position. Further, the nozzle portions 27a are not provided on the tip end of the gas pipe 27. All other configurations are similar or identical to the fifth embodiment.

With the water treatment apparatus and water treatment method described above, the gas pipe 27 is removed from the plate electrode 2, and therefore, by adjusting the position, gas ejection angle, and so on of the gas pipe 27 as desired, an improvement in freedom is obtained in terms of the droplet generation position and so on.

Note that in the sixth embodiment, a position and an angle of a spray port of the gas pipe 27 may be set as desired in accordance with the required positions and amounts of the droplets 13a, 13b, 13c, the electrode arrangement, and so on. For example, when the gas is sprayed at an almost vertical angle relative to the flow direction of the water to be treated 4, the formed droplets 13a, 13b, 13c are distributed over a wide region. When the gas is sprayed at an almost horizontal angle relative to the flow direction of the water to be treated 4, on the other hand, the droplets 13a, 13b, 13c are formed in localized positions.

Further, the droplets 13a, 13b, 13c may be formed by submerging the spray port of the gas pipe 27 in the water to be treated 4.

Furthermore, in the fifth and sixth embodiments, a gas canister disposed on the outside of the treatment tank 1 (FIGS. 1 and 5), for example, may be used as the gas source 26. In this case, a gas such as oxygen may be supplied to the treatment tank 1 through the gas pipe 27 instead of the gas supply port 1d according to the first embodiment.

Moreover, in the fifth and sixth embodiments, there are no particular limitations on the composition of the gas used to form the droplets 13a, 13b, 13c, but oxygen gas or a mixed gas containing oxygen gas and an inert gas is preferably used. In so doing, the reaction rates of Equations (1) and (3) increase, and as a result, a superior water treatment effect is obtained.

Further, in the fifth and sixth embodiments, the gas does not necessarily have to be supplied continuously from the gas source 26, and may be supplied intermittently. For example, when the gas is supplied intermittently, a momentary value of the gas flow speed can be increased while keeping an average flow rate equal to that of a case in which the gas is supplied continuously. As a result, the droplets 13a, 13b, 13c can be formed more effectively.

Seventh Embodiment

Figure 19:
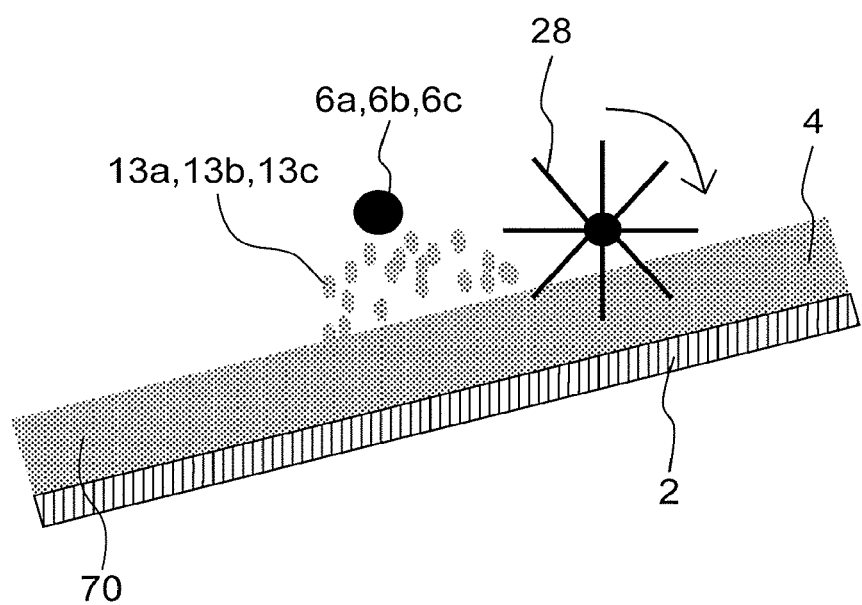
FIG. 19 is a sectional view showing main parts of a water treatment apparatus according to a seventh embodiment of this invention.

FIG. 19 is a sectional view showing main parts of a water treatment apparatus according to a seventh embodiment of this invention. In the seventh embodiment, a plurality of splashing mechanisms 28 (only one of which is shown in FIG. 19) that form the droplets by mechanically splashing the water to be treated 4 upward while contacting the water to be treated 4 are used as the droplet forming apparatus. Water wheels, for example, maybe used as the splashing mechanisms 28.

The splashing mechanisms 28 are respectively disposed predetermined distances away from the wire electrodes 6a, 6b, 6c on the upstream side of the wire electrodes 6a, 6b, 6c relative to the flow direction of the water to be treated 4. Further, the splashing mechanisms 28 are disposed such that lower sides thereof are partially submerged in the water film 70 of the water to be treated 4, and so as to be driven to rotate by power from a motor (not shown). When the splashing mechanisms 28 rotate, power is exerted on the water to be treated 4, causing some of the water to be treated 4 to splash upward and form droplets. All other configurations are similar or identical to the first or second embodiment.

With the water treatment apparatus and water treatment method described above, the amount of generated droplets and the timing at which the droplets are formed can be set appropriately by controlling a rotation speed or a drive timing of the splashing mechanisms 28.

Further, in the seventh embodiment, at least some of the water to be treated 4 splashes upward so as to form droplets when power is exerted thereon by the splashing mechanisms 28, and therefore, in contrast to a case where a nozzle or a shower head is used to form the droplets, the droplets are formed without passing the water to be treated 4 through extremely narrow holes. Accordingly, blockages caused by contaminants in the water to be treated 4 do not occur in the droplet forming apparatus, and as a result, maintenance is required less frequently, meaning that the apparatus can be operated at a high utilization rate.

Note that in the seventh embodiment, the splashing mechanisms 28 are rotated by power from the motor, but instead, the splashing mechanisms 28 may be rotated by the flow of the water to be treated 4. In this case, the droplets 13a, 13b, 13c can be formed by the fluid energy of the flowing water to be treated 4 instead of driving the ultrasonic transducers 12a, 12b, 12c, supplying a gas, or the like.

Further, the splashing mechanisms 28 are not limited to waterwheels, and a mechanism that slaps the water surface with a plate-shaped member or the like, for example, may be used instead.

Eighth Embodiment

Figure 20:
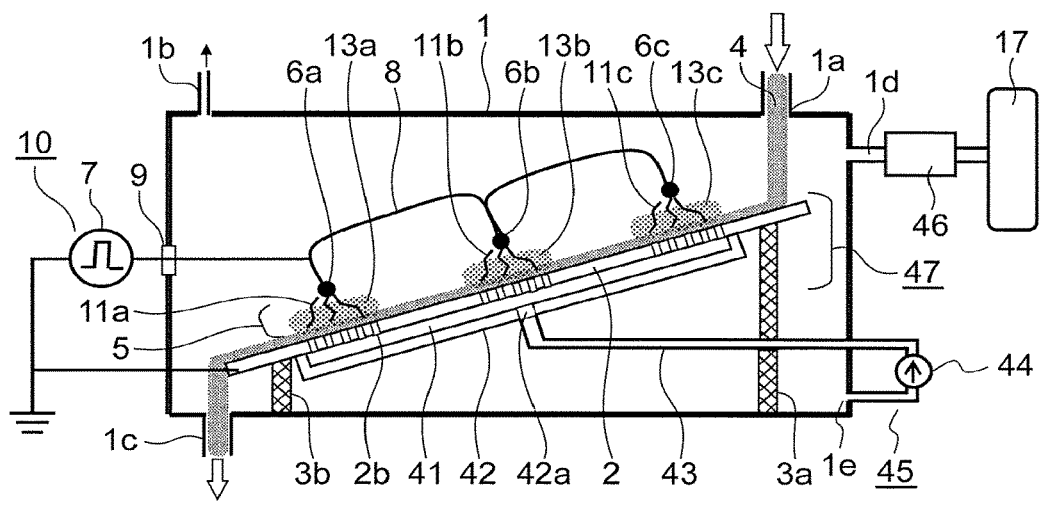
FIG. 20 is a sectional view showing a water treatment apparatus according to an eighth embodiment of this invention.

FIG. 20 is a sectional view showing a water treatment apparatus according to an eighth embodiment of this invention. A plurality of narrow holes 2b that penetrate the plate electrode 2 in the thickness direction are provided respectively in regions of the plate electrode 2 near the wire electrodes 6a, 6b, 6c, or in other words the regions of the plate electrode 2 where the discharges 11a, 11b, 11c are formed.

A back plate (a gas storage chamber forming member) 42 is fixed hermetically to the lower surface of the plate electrode 2 so as to form a gas storage chamber 41 between itself and the plate electrode 2. The gas storage chamber 41 is connected to all of the narrow holes 2b. A circulation pipe connection port 42a is provided centrally in the back plate 42.

A gas intake port 1e is provided in a lower portion of a side face of the treatment tank 1. A first end portion of a gas circulation pipe 43 is connected to the gas intake port 1e. The first end portion of the gas circulation pipe 43 is disposed outside the treatment tank 1. A second end portion of the gas circulation pipe 43 is connected to the circulation pipe connection port 42a.

An air pump 44 serving as a gas delivery unit is provided in the part of the gas circulation pipe 43 disposed outside the treatment tank 1. A gas circulation apparatus 45 that doubles as the droplet forming apparatus and the gas ejection apparatus of the eighth embodiment includes the back plate 42, the gas circulation pipe 43, and the air pump 44, and is configured to take in gas from the treatment tank 1 and eject the intake gas upward into the narrow holes 2b.

The gas supply source 17 is connected to the gas supply port 1d via a pressure regulator 46. Further, a water treatment unit 47 according to the eighth embodiment includes the plate electrode 2, the wire electrodes 6a, 6b, 6c, and the back plate 42 serving as a part of the gas circulation apparatus 45.

Next, an operation will be described. The water to be treated 4 supplied to the treatment tank 1 through the water feed port 1a flows over the upper surface of the plate electrode 2, and is discharged through the water discharge port 1c. The oxygen gas supplied to the treatment tank 1 through the gas supply port 1d is discharged to the outside of the treatment tank 1 through the gas discharge port 1b. At this time, predetermined pressure loss occurs in the gas discharge port 1b, but by operating the pressure regulator 46, the internal pressure of the treatment tank 1 can be kept higher than outside air pressure.

Meanwhile, by operating the air pump 44, the gas in the treatment tank 1 is ejected through the narrow holes 2b onto the plate electrode 2. As a result, some of the water to be treated 4 flowing over the plate electrode 2 splashes up so as to form the droplets 13a, 13b, 13c. All other configurations and operations are similar or identical to the first embodiment.

With the water treatment apparatus and water treatment method described above, the water to be treated 4 can be formed into droplets using circulated gas, i.e. without the need to use the gas source 26, as in the fifth and sixth embodiments. Therefore, only enough gas for maintaining the interior of the treatment tank 1 at a predetermined pressure and compensating for the gas consumed during the water treatment (gas consumed to oxidize and decompose the organic substance and gas that dissolves into the water to be treated 4) need be supplied from the gas supply source 17. As a result, the amount of used gas can be suppressed, enabling a reduction in running costs during the water treatment.

Further, in the eighth embodiment, the droplets 13a, 13b, 13c are formed by exerting power on the water to be treated 4 using the gas circulation apparatus 45. Therefore, the droplets are formed by the gas flowing through the narrow holes 2b, in contrast to a case where a nozzle or a shower head is used to form the droplets such that the droplets are formed by passing the water to be treated 4 through extremely narrow holes. Accordingly, blockages caused by contaminants in the water to be treated 4 do not occur in the narrow holes 2b, and as a result, maintenance is required less frequently, meaning that the apparatus can be operated at a high utilization rate.

Furthermore, in the eighth embodiment, the $O_3$ gas and $H_2O_2$ gas generated by discharge fill the treatment tank 1, but the gas containing the $O_3$ and $H_2O_2$ is circulated by the gas circulation apparatus 45 so as to be ejected into the water film 70 of the water to be treated 4 flowing over the plate electrode 2. Therefore, as shown in FIGS. 12 to 17, the circulating gas containing the $O_3$ and $H_2O_2$ forms air bubbles which rise through the water film 70. At this time, the $O_3$ and $H_2O_2$ in the gas dissolve into the water to be treated 4 through the gas-liquid interface. Hence, as described in the fifth embodiment, dissolution of the $O_3$ and $H_2O_2$ into the water to be treated can be promoted to a greater extent than when the circulating gas is not used. Accordingly, the reaction in water shown in Equation (9), by which the organic substance is decomposed, can be promoted, leading to an improvement in the water treatment performance.

Moreover, in the eighth embodiment, the gas is circulated by the air pump 44 so as to turn the water to be treated 4 into droplets while the water to be treated 4 flows down naturally over the plate electrode 2 by gravity. A pump typically consumes considerably less energy to transport a gas than to transport a liquid, and therefore a superior water treatment effect can be obtained at a lower energy consumption than in a case where the droplets are formed by circulating the water to be treated using a pump, as in the water treatment apparatus of PTL 1.

Note that in the eighth embodiment, the air pump 44 is disposed outside the treatment tank 1, but the air pump 44 may be disposed inside the treatment tank 1. In this case, there is no need to provide the gas intake port 1e in the treatment tank 1, and only the gas circulation pipe 43 need be laid inside the treatment tank 1.

Figure 21:
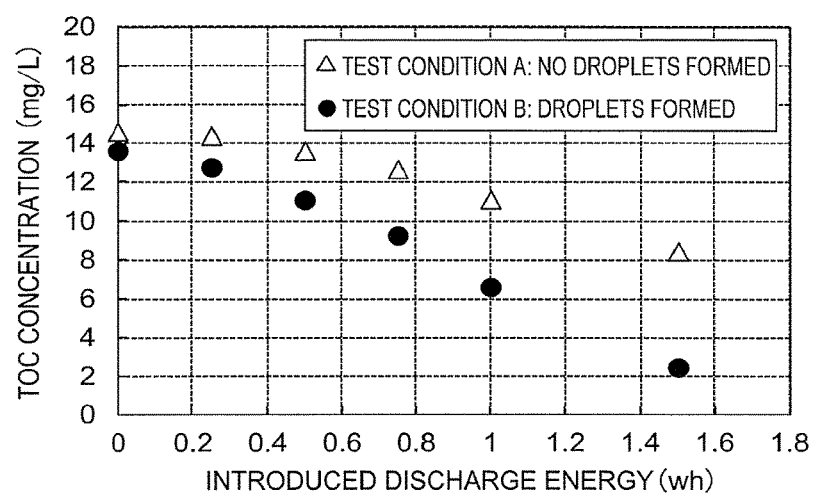
FIG. 21 is a graph showing results of a water treatment test performed using the water treatment apparatus of FIG. 20.

FIG. 21 is a graph showing results of a water treatment test performed using the water treatment apparatus of FIG. 20. In the test, an aqueous solution of sodium acetate having a total organic carbon (TOC) concentration of approximately 14 mg/l was circulated at a flow rate of 150 ml per minute as the water to be treated 4. Further, oxygen gas was supplied to the treatment tank 1 at a flow rate of 250 ml per minute, and a pulse discharge was formed. The water to be treated 4 was sampled at fixed time intervals, and the TOC concentration was measured using a total oxygen carbon concentration meter (TOC-Vw, manufactured by Shimadzu Corporation).

Under a test condition A, the test was performed without operating the air pump 44 shown in FIG. 20, with the result that the droplets 13a, 13b, 13c were not formed. Under a test condition B, the test was performed by operating the air pump 44 shown in FIG. 20 so that the droplets 13a, 13b, 13c were formed.

It was found as a result that under the test condition A, an initial TOC concentration of 14.6 mg/l decreased to 11.1 mg/l (a reduction of 3.5 mg/l) following the introduction of 1 Wh of discharge energy. Under the test condition B, however, an initial TOC concentration of 13.6 mg/l decreased to 6.6 mg/l (a reduction of 7.0 mg/l) following the introduction of 1 Wh of discharge energy.

Hence, it was confirmed that by forming droplets from the water to be treated 4, a vast improvement was obtained in the speed at which the sodium acetate serving as the persistent substance decomposed.

Ninth Embodiment

Figure 22:
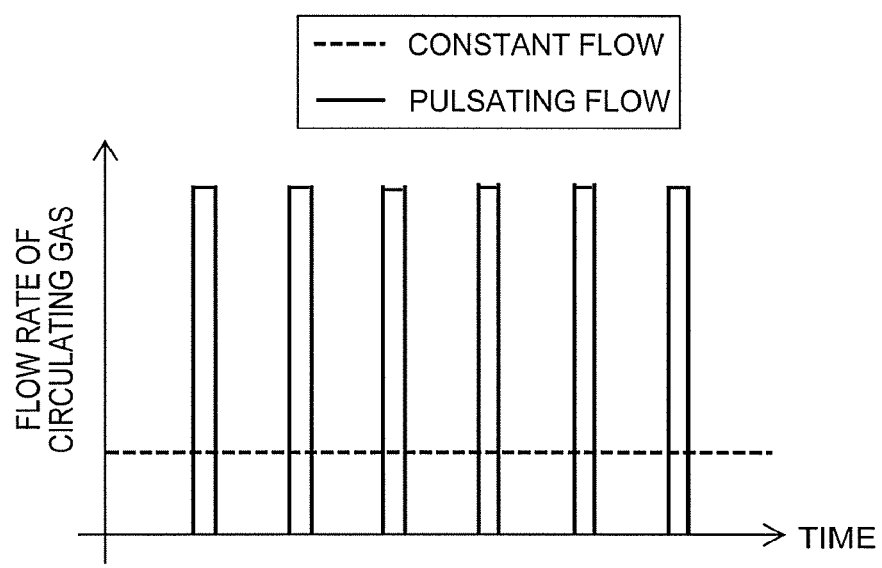
FIG. 22 is a graph showing a relationship between a flow rate of circulating gas circulating through a water treatment apparatus according to a ninth embodiment of this invention and time.

FIG. 22 is a graph showing a relationship between a flow rate of circulating gas circulating through a water treatment apparatus according to a ninth embodiment of this invention and time. In the eighth embodiment, the water to be treated 4 is formed into droplets by circulating gas using the air pump 44, whereas in the ninth embodiment, a pulsating flow is formed by varying the circulation flow rate of the gas over time. In other words, the gas circulation apparatus 45 according to the ninth embodiment forms the water to be treated 4 into droplets intermittently.

In FIG. 22, at a constant flow indicated by a dotted line, the flow rate of the circulating gas remains constant without varying over time. When, on the other hand, a pulsating flow is formed, as shown by a solid line, a time proportion during which the circulating gas flows is ¼ (in other words, a duty ratio of 25%), and therefore the flow rate increases by a multiple of four. Hence, with a constant flow and a pulsating flow, identical amounts of gas flow over a fixed time period, but the gas flows at different timings.

A method of providing a valve midway in the gas circulation pipe 43 and controlling opening/closing of the valve, for example, may be cited as a method of forming a pulsating flow. Alternatively, when a diaphragm pump or a bellows pump is used as the air pump 44, the pump itself has a pulsating property, and therefore a pulsating flow can be formed without providing a separate valve or the like. All other configurations and operations are similar or identical to the eighth embodiment.

In the water treatment apparatus shown in FIG. 20, a larger number of droplets are formed as the flow speed of the gas passing through the narrow holes 2b increases. According to the ninth embodiment, therefore, in which the circulating gas is supplied in a pulsating flow, a larger number of droplets can be formed using a similar amount of circulating gas than in case where the circulating gas is supplied in a constant flow. As a result, either the capacity of the air pump 44 can be reduced in order to form an equal number of droplets, or the amount of formed droplets can be increased using an air pump 44 having an identical capacity.

Note that the flow rate of the circulating gas does not necessarily have to be set as a pulsating flow, as shown in FIG. 22, and instead, the flow rate of the circulating gas may be modulated over time. The flow rate, duty ratio, and pulsation period of the circulating gas may be determined as appropriate in accordance with the manner in which the droplets are to be formed.

Tenth Embodiment

Figure 23:
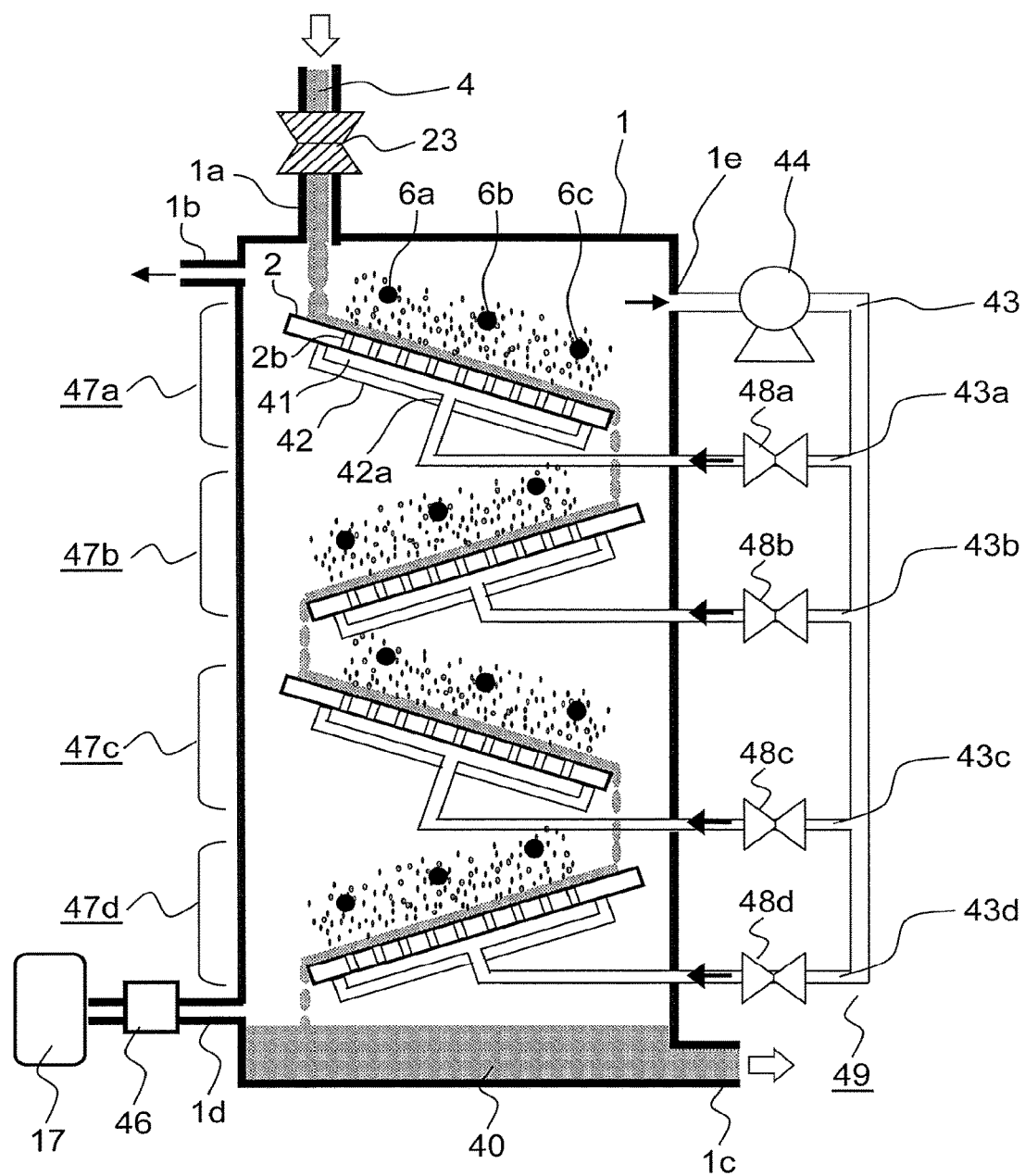
FIG. 23 is a sectional view showing a water treatment apparatus according to a tenth embodiment of this invention.

FIG. 23 is a sectional view showing a water treatment apparatus according to a tenth embodiment of this invention. A plurality of (here, four) water treatment units 47a, 47b, 47c, 47d are disposed in the treatment tank 1 and arranged in multiple stages in the vertical direction. Similarly to the water treatment unit 47 of the eighth embodiment, the water treatment units 47a, 47b, 47c, 47d each include the plate electrode 2, the wire electrodes 6a, 6b, 6c, and the back plate 42.

Further, the plate electrodes 2 of the respective water treatment units 47a, 47b, 47c, 47d are tilted in alternating opposite directions relative to the horizontal plane so that the water to be treated 4 flows continuously downward (in a zigzag shape) from the uppermost water treatment unit 47a to the lowermost water treatment unit 47d. In other words, in the water treatment units 47a, 47b, 47c, 47d provided adjacent to each other in the vertical direction, the plate electrodes 2 are disposed in opposite incline directions relative to the horizontal plane.

The gas circulation pipe 43 bifurcates into first to fourth branch pipes 43a, 43b, 43c, 43d on a downstream side of the air pump 44. Tip ends of the branch pipes 43a, 43b, 43c, 43d are respectively connected to the circulation pipe connection port 42a of the corresponding water treatment unit 47a, 47b, 47c, 47d.

A first valve 48a is provided in the first branch pipe 43a connected to the uppermost water treatment unit 47a. A second valve 48b is provided in the second branch pipe 43b connected to the second-stage water treatment unit 47b. A third valve 48c is provided in the third branch pipe 43c connected to the third-stage water treatment unit 47c. A fourth valve 48d is provided in the fourth branch pipe 43d connected to the lowermost water treatment unit 47d.

A gas circulation apparatus 49 serving as the droplet forming apparatus according to the tenth embodiment includes the respective back plates 42 of the water treatment units 47a, 47b, 47c, 47d, the gas circulation pipe 43 including the branch pipes 43a, 43b, 43c, 43d, and the air pump 44. All other configurations are similar or identical to the eighth embodiment.

In FIG. 23, the water to be treated 4 is regulated to a predetermined flow rate by the water amount adjustment mechanism 23 and then supplied to the treatment tank 1 through the water feed port 1a. The water to be treated 4 supplied to the treatment tank 1 flows down successively from the uppermost water treatment unit 47a to the lowermost water treatment unit 47d, collects in the bottom of the treatment tank 1 as the treated water 40, and is discharged through the water discharge port 1c. At this time, the water feed port 1a is blocked by the water to be treated 4 while the water discharge port 1c is blocked by the treated water 40, and therefore no gas passes through either of the ports.

The oxygen gas supplied by the gas supply source 17 is regulated by the pressure regulator 46 to a flow rate at which the internal pressure of the treatment tank 1 reaches a predetermined pressure that is higher than the outside air pressure, and is supplied thus to the treatment tank 1. The gas in the treatment tank 1 is taken in through the gas intake port 1e by the air pump 44 so as to be supplied to the water treatment units 47a, 47b, 47c, 47d through the branch pipes 43a, 43b, 43c, 43d, and as a result, the water to be treated 4 is formed into droplets while flowing downward.

Figure 24:
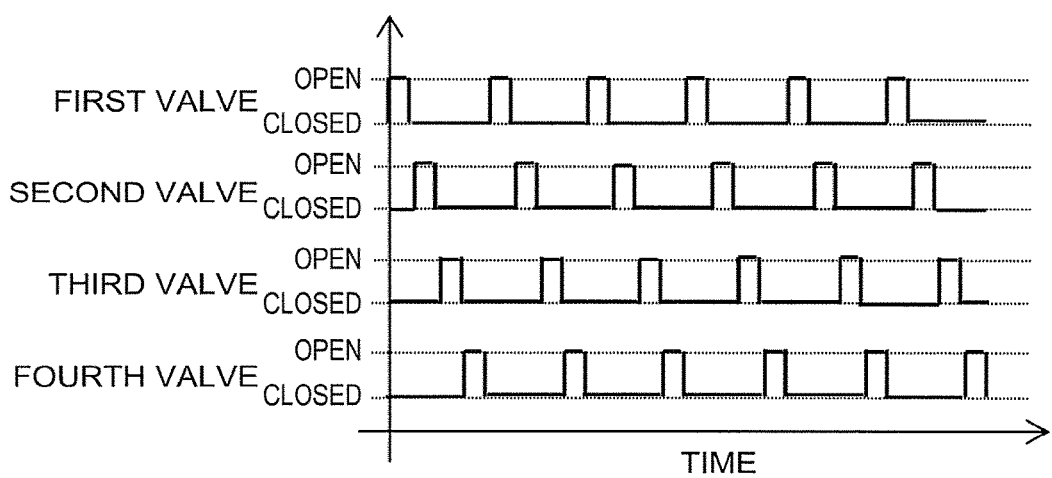
FIG. 24 is a timing chart showing opening/closing operations of first to fourth valves shown in FIG. 23.

FIG. 24 is a timing chart showing opening/closing operations of the first to fourth valves 48a, 48b, 48c, 48d shown in FIG. 23. The first to fourth valves 48a, 48b, 48c, 48d are opened and closed periodically. Further, open duty ratios of the valves 48a, 48b, 48c, 48d are all set at 25%.

Furthermore, the valves 48a, 48b, 48c, 48d are opened at a ¼ period offset relative to each other. Therefore, two or more of the valves 48a, 48b, 48c, 48d are never open simultaneously, and when any one of the valves is open, the other valves are closed. Moreover, one of the valves 48a, 48b, 48c, 48d is open at all times. Hence, the droplets can be formed efficiently at a lower circulating gas flow rate than when the circulating gas is supplied to all of the water treatment units 47a, 47b, 47c, 47d simultaneously.

With the water treatment apparatus and water treatment method described above, the water treatment units 47a, 47b, 47c, 47d are disposed in multiple stages, and therefore the water to be treated 4 contacts the discharges 11a, 11b, 11c for an extended period of time. Hence, a superior water treatment effect than that of the eighth embodiment is obtained even though the water to be treated 4 is passed through the treatment tank 1 only once. In other words, a superior water treatment effect is obtained simply by passing the water to be treated 4 once through the single treatment tank, i.e. without using a pump to circulate the water to be treated 4 so that the water to be treated 4 passes through the treatment tank 1 a plurality of times or connecting a plurality of treatment tanks 1 in series so that the water to be treated 4 passes through the plurality of treatment tanks 1. In comparison with the eighth embodiment, therefore, the amount of power required to draw up the water to be treated 4 can be reduced, and the apparatus configuration can be simplified.

Further, the plurality of water treatment units 47a, 47b, 47c, 47d are arranged in multiple stages in the vertical direction so that the water to be treated 4 flows continuously downward from the uppermost water treatment unit 47a to the lowermost water treatment unit 47d, and therefore the footprint of the treatment tank 1 can be reduced in comparison with a case where an identical treatment area is formed by a single water treatment unit. As a result, the water to be treated 4 can be treated quickly and efficiently using a comparatively small apparatus.

Moreover, droplets can be formed by the four water treatment units 47a, 47b, 47c, 47d using the single air pump 44, and therefore the apparatus configuration can be simplified, leading to a reduction in the cost of the apparatus.

Furthermore, by providing the valves 48a, 48b, 48c, 48d in the branch pipes 43a, 43b, 43c, 43d and opening and closing the valves 48a, 48b, 48c, 48d at different timings, the droplets can be formed efficiently at a low circulating gas flow rate.

Note that the valves 48a, 48b, 48c, 48d do not necessarily have to be provided, and instead, the circulating gas may flow through the branch pipes 43a, 43b, 43c, 43d constantly.

Moreover, the valves 48a, 48b, 48c, 48d may be set to open and close at desired timings in accordance with the composition of the water to be treated 4, and do not necessarily have to be opened and closed as shown in FIG. 24.

Eleventh Embodiment

Figure 25:
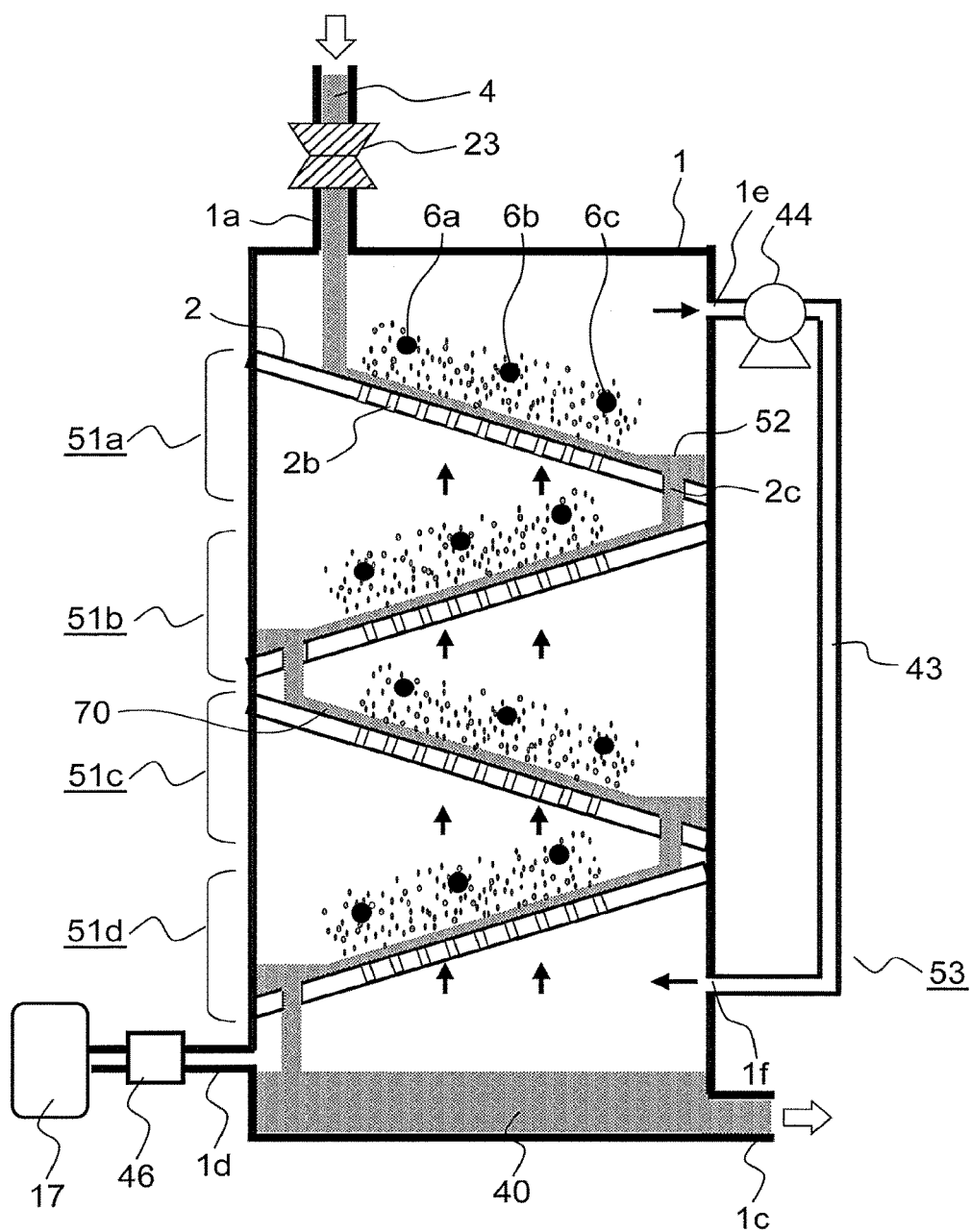
FIG. 25 is a sectional view showing a water treatment apparatus according to an eleventh embodiment of this invention.

FIG. 25 is a sectional view showing a water treatment apparatus according to an eleventh embodiment of this invention. A plurality of (here, four) water treatment units 51a, 51b, 51c, 51d are disposed in the treatment tank 1 and arranged in multiple stages in the vertical direction. The water treatment units 51a, 51b, 51c, 51d are respectively formed by removing the back plate 42 from the water treatment unit 47 according to the eighth embodiment. In other words, the water treatment units 51a, 51b, 51c, 51d each include the plate electrode 2 and the wire electrodes 6a, 6b, 6c.

A peripheral edge portion of the plate electrode 2 of each water treatment unit 51a, 51b, 51c, 51d is connected hermetically to an inner wall surface of the treatment tank 1. As a result, a plurality of (in this example, five) independent divided spaces (hermetic spaces) are formed in the treatment tank 1 above and below the respective plate electrodes 2. In other words, a space inside the treatment tank 1 is partitioned into five divided spaces by the plate electrodes 2. The vertically adjacent divided spaces are connected only by the narrow holes 2b penetrating the plate electrodes 2.

Further, a water collecting portion 52 where the water to be treated 4 collects is formed on a downstream side end portion of each plate electrode 2. One or a plurality of through holes 2c are formed near the downstream side end portion of each plate electrode 2 to allow the water to be treated 4 that collects in the water collecting portion 52 to drop down.

The gas intake port 1e is disposed to face the uppermost divided space, or in other words the space on the upper side of the uppermost plate electrode 2. The end portion of the gas circulation pipe 43 on the opposite side to the gas intake port 1e does not bifurcate, and is connected to a gas ejection port 1f provided in the treatment tank 1. The gas ejection port 1f is disposed to face the lowermost divided space, or in other words the space on the lower side of the lowermost plate electrode 2. Furthermore, the gas discharge port 1b is not provided in the treatment tank 1.

A gas circulation apparatus 53 serving as the droplet forming apparatus according to the eleventh embodiment includes the air pump 44 and the gas circulation pipe 43. All other configurations are similar or identical to the tenth embodiment.

In FIG. 25, the water to be treated 4 supplied to the treatment tank 1 flows down successively from the uppermost water treatment unit 51a to the lowermost water treatment unit 51d, collects in the bottom of the treatment tank 1 as the treated water 40, and is discharged through the water discharge port 1c. At this time, the water to be treated 4 that collects in the respective water collecting portion 52 drops down toward the lower end through the through holes 2c.

The oxygen gas from the gas supply source 17 is regulated by the pressure regulator 46 to a flow rate at which the internal pressure of the treatment tank 1 reaches a predetermined pressure that is higher than the outside air pressure, and is supplied thus to the treatment tank 1. The gas in the treatment tank 1 is taken in through the gas intake port 1e by the air pump 44 and supplied to the lowermost divided space through the gas ejection port 1f.

The gas supplied to the treatment tank 1 through the gas ejection port 1f passes through the narrow holes 2b so as to move upward through the upper divided spaces in succession. At this time, some of the water to be treated 4 flowing over the plate electrodes 2 forms droplets in the respective water treatment units 51a, 51b, 51c, 51d. All other operations are identical to the tenth embodiment.

In the eleventh embodiment, the internal pressure of the treatment tank 1 is highest in the lowermost divided space, and decreases gradually through the upper divided spaces. As a result, a circulating gas flow generated by the air pump 44 is formed as a series of flows traveling upward through the treatment tank 1.

Further, in eleventh embodiment, the depth of the water in the respective water collecting portions 52 is greater than the thickness of the water film of the water to be treated 4 flowing down over the respective plate electrodes 2. Therefore, the circulating gas flowing upward through the treatment tank 1 passes through the narrow holes 2b but does not pass through the through holes 2c. As a result, the water to be treated 4 can be formed into droplets efficiently.

Furthermore, in the tenth embodiment, the branch pipes 43a, 43b, 43c, 43d are connected respectively to the water treatment units 47a, 47b, 47c, 47d, whereas in the eleventh embodiment, the branch pipes 43a, 43b, 43c, 43d are not required, and therefore the apparatus configuration is simplified.

Moreover, in the eleventh embodiment, the water treatment units 51a, 51b, 51c, 51d are connected in series to the air pump 44, and therefore the entire amount of the circulating gas passes through all of the water treatment units 51a, 51b, 51c, 51d in sequence, leading to an improvement in the efficiency with which the droplets are formed.

Note that in the tenth and eleventh embodiments, the number of water treatment units may be set appropriately in accordance with the dimensions of the treatment tank 1, the required water treatment capacity, and so on.

Twelfth Embodiment

Figure 26:
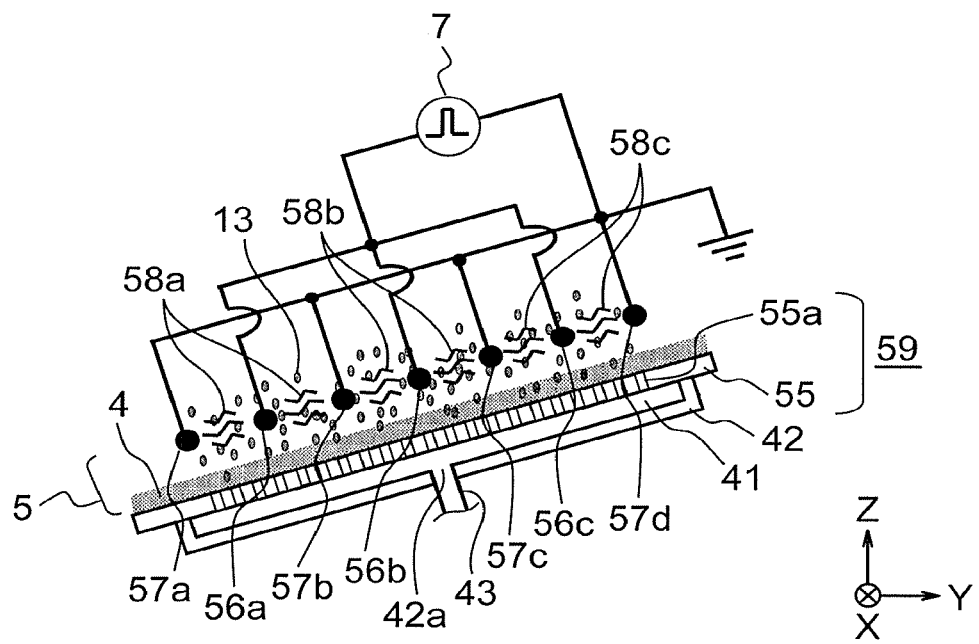
FIG. 26 is a sectional view showing main parts of a water treatment apparatus according to a twelfth embodiment of this invention.

FIG. 26 is a sectional view showing main parts of a water treatment apparatus according to a twelfth embodiment of this invention. In the twelfth embodiment, a tilted plate 55 is used instead of the plate electrode 2 according to the eighth embodiment. A plurality of narrow holes 55a are provided in the tilted plate 55.

Seven wire electrodes serving as discharge forming bodies, or more specifically three high voltage wire electrodes 56a, 56b, 56c and four grounded wire electrodes 57a, 57b, 57c, 57d, are disposed above the tilted plate 55 so as to oppose the tilted plate 55 across the void 5. The wire electrodes 56a, 56b, 56c, 57a, 57b, 57c, 57d are disposed at intervals in the flow-down direction of the water to be treated 4.

Further, the wire electrodes 56a, 56b, 56c, 57a, 57b, 57c, 57d are disposed at equal intervals relative to an upper surface of the tilted plate 55. Furthermore, the wire electrodes 56a, 56b, 56c, 57a, 57b, 57c, 57d extend horizontally so as to be parallel to a width direction (an X axis direction in FIG. 26) of the tilted plate 55.

Moreover, the high voltage wire electrodes 56a, 56b, 56c and the grounded wire electrodes 57a, 57b, 57c, 57d, are disposed alternately in the flow-down direction of the water to be treated 4. The high voltage wire electrodes 56a, 56b, 56c are connected to the pulse power supply 7. The grounded wire electrodes 57a, 57b, 57c, 57d are grounded.

As a result, pairs are formed from adjacent electrodes, or more specifically the electrodes 56a, 57a, the electrodes 56a, 57b, the electrodes 56b, 57b, the electrodes 56b, 57c, the electrodes 56c, 57c, and the electrodes 56c, 57d, such that discharges 58a, 58b, 58c are formed between the respective pairs of electrodes. The narrow holes 55a are provided evenly over the entire region of the tilted plate 55 opposing the wire electrodes 56a, 56b, 56c, 57a, 57b, 57c, 57d.

The back plate 42 is fixed hermetically to a lower surface of the tilted plate 55. The gas storage chamber 41 is connected to all of the narrow holes 55a. A water treatment unit 59 according to the twelfth embodiment includes the tilted plate 55, the high voltage wire electrodes 56a, 56b, 56c, the grounded wire electrodes 57a, 57b, 57c, 57d, and the back plate 42.

In the twelfth embodiment, the discharges 58a, 58b, 58c are formed between the high voltage wire electrodes 56a, 56b, 56c and the grounded wire electrodes 57a, 57b, 57c, 57d. By ejecting the circulating gas through the narrow holes 55a at this time, the droplets 13 are formed, whereby the water treatment is performed. All other configurations and operations are similar or identical to the eighth embodiment.

With the water treatment apparatus and water treatment method described above, the droplets 13 splash up in a direction traversing the discharges 58a, 58b, 58c (here, the discharges 58a, 58b, 58c are formed in a right angle direction relative to the direction in which the droplets 13 splash up). Accordingly, contact is more likely to occur between the droplets 13 and the discharges 58a, 58b, 58c than in a case such as that of the first embodiment (FIG. 1), for example, where the discharges 11a, 11b, 11c are formed between the wire electrodes 6a, 6b, 6c and the water surface of the water to be treated 4. As a result, an improvement in the water treatment efficiency is achieved.

Note that in the twelfth embodiment, the tilted plate 55 may be, but does not have to be, electrically grounded. When the tilted plate 55 is electrically grounded, discharges are also formed between the high voltage wire electrodes 56a, 56b, 56c and the water surface of the water to be treated 4 on the tilted plate 55. As a result, a discharge region can be widened, leading to an increase in the speed of the water treatment.

When the tilted plate 55 is not electrically grounded, on the other hand, the tilted plate 55 can be formed as an insulator. By forming the tilted plate 55 from a ceramic such as alumina, sputtering and corrosion caused by discharge can be suppressed, enabling an increase in the lifespan of the apparatus. Further, when the tilted plate 55 is not electrically grounded, the arrangement and shape of the tilted plate 55 can be determined without taking discharge formation into consideration, and as a result, an increase in design freedom is obtained in terms of the size of the void 5 and so on, for example.

Moreover, the twelfth embodiment may be combined as appropriate with the ninth to eleventh embodiments. For example, in the apparatus according to the twelfth embodiment, the flow rate of the circulating gas may be varied over time so as to form a pulsating flow. Further, the water treatment unit 59 according to the twelfth embodiment may be disposed in multiple stages, as in the tenth or eleventh embodiment.

Furthermore, the direction in which the droplets 13 splash up does not necessarily have to be a right angle relative to the formation direction of the discharges 58a, 58b, 58c, and as long as the droplets 13 splash up in a direction traversing the discharges 58a, 58b, 58c, an improvement in the efficiency of the water treatment is achieved.

Thirteenth Embodiment

Figure 27:
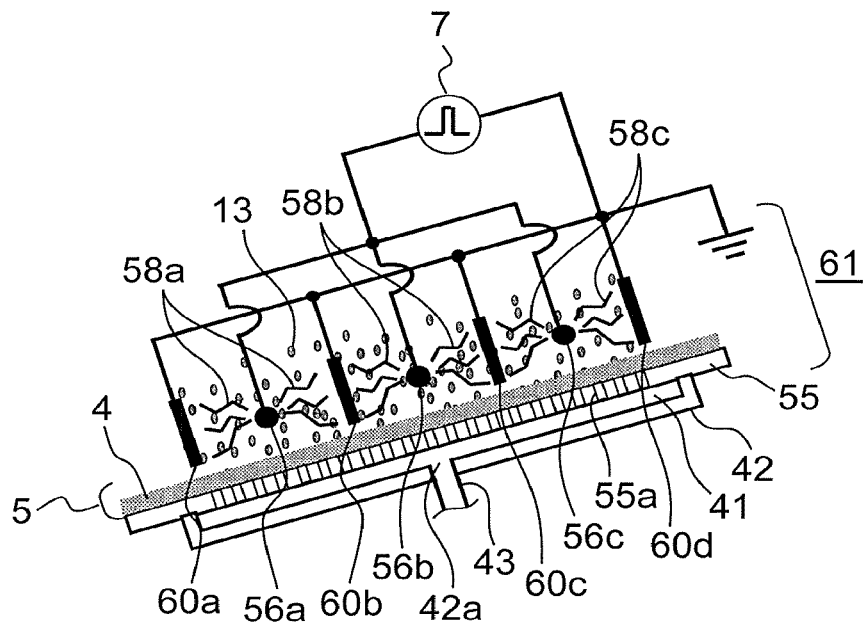
FIG. 27 is a sectional view showing main parts of a water treatment apparatus according to a thirteenth embodiment of this invention.

FIG. 27 is a sectional view showing main parts of a water treatment apparatus according to a thirteenth embodiment of this invention. In the thirteenth embodiment, the grounded wire electrodes 57a, 57b, 57c, 57d of the twelfth embodiment are replaced with grounded plate electrodes 60a, 60b, 60c, 60d. The grounded plate electrodes 60a, 60b, 60c, 60d are disposed at a right angle relative to the upper surface of the tilted plate 55.

A water treatment unit 61 according to the thirteenth embodiment includes the tilted plate 55, the high voltage wire electrodes 56a, 56b, 56c, the grounded plate electrodes 60a, 60b, 60c, 60d, and the back plate 42. All other configurations and operations are similar or identical to the twelfth embodiment.

With the water treatment apparatus and water treatment method described above, the grounded plate electrodes 60a, 60b, 60c, 60d are used, and therefore the discharges 58a, 58b, 58c are formed over a wider region than in the twelfth embodiment. As a result, the droplets 13 remain in contact with the discharges 58a, 58b, 58c for a longer time, enabling an increase in the speed of the water treatment.

Note that the thirteenth embodiment maybe combined as appropriate with the ninth to eleventh embodiments. For example, in the apparatus according to the thirteenth embodiment, the flow rate of the circulating gas may be varied over time so as to form a pulsating flow. Further, the water treatment unit 61 according to the thirteenth embodiment may be disposed in multiple stages, as in the tenth or eleventh embodiment.

Fourteenth Embodiment

Figure 28:
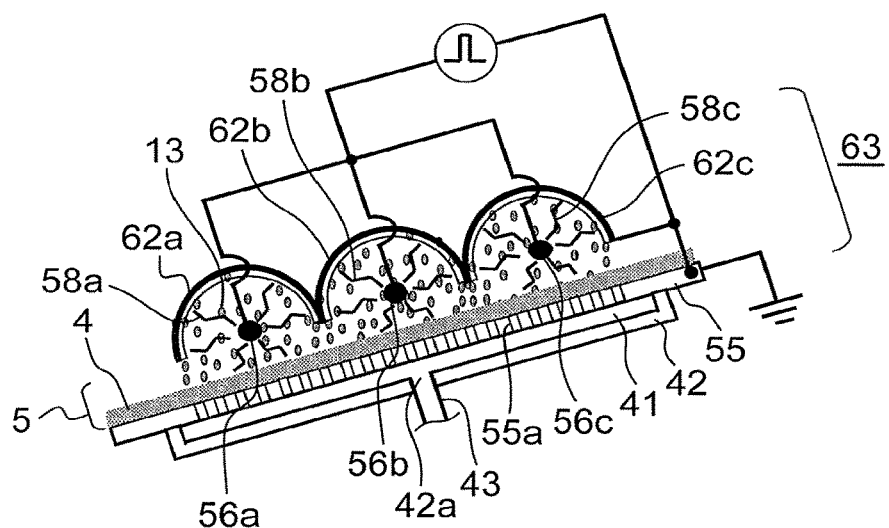
FIG. 28 is a sectional view showing main parts of a water treatment apparatus according to a fourteenth embodiment of this invention.

FIG. 28 is a sectional view showing main parts of a water treatment apparatus according to a fourteenth embodiment of this invention. In the fourteenth embodiment, grounded arc electrodes 62a, 62b, 62c obtained by bending flat plates into a form having an arc-shaped cross-section are used in place of the grounded plate electrodes 60a, 60b, 60c, 60d according to the twelfth embodiment. The grounded arc electrodes 62a, 62b, 62c are disposed such that respective recessed surface sides thereof oppose the upper surface of the tilted plate 55 across a void.

Adjacent grounded arc electrodes 62a, 62b, 62c are connected to each other. The high voltage wire electrodes 56a, 56b, 56c are disposed respectively between the grounded arc electrodes 62a, 62b, 62c and the tilted plate 55. In other words, the respective grounded arc electrodes 62a, 62b, 62c are disposed so as to cover the corresponding high voltage wire electrode 56a, 56b, 56c. The tilted plate 55 is made of metal and grounded. In other words, the tilted plate 55 doubles as a plate electrode (a ground electrode).

A water treatment unit 63 according to the fourteenth embodiment includes the tilted plate 55, the high voltage wire electrodes 56a, 56b, 56c, the grounded arc electrodes 62a, 62b, 62c, and the back plate 42. All other configurations and operations are similar or identical to the twelfth embodiment.

With the water treatment apparatus and water treatment method described above, the grounded arc electrodes 62a, 62b, 62c are used, and therefore the discharges 58a, 58b, 58c are formed over a wider region than in the twelfth or thirteenth embodiment. As a result, the droplets 13 remain in contact with the discharges 58a, 58b, 58c for a longer time, enabling an increase in the speed of the water treatment.

Further, the grounded arc electrodes 62a, 62b, 62c are disposed so as to surround the high voltage wire electrodes 56a, 56b, 56c, and therefore a more even electric field is formed. Hence, the discharges 58a, 58b, 58c do not increase in strength locally, and as a result, arcing is suppressed such that even, stable discharges are formed.

Furthermore, the grounded arc electrodes 62a, 62b, 62c are disposed so as to cover the droplets 13 that splash up, and therefore some of the droplets 13 adhered to the grounded arc electrodes 62a, 62b, 62c form new droplets 13 that drop down toward the tilted plate 55. Moreover, the remaining droplets 13 adhered to the grounded arc electrodes 62a, 62b, 62c flow over the inner surface of the grounded arc electrodes 62a, 62b, 62c in response to surface tension. When this operation is performed repeatedly, increases are obtained in the contact time between the water to be treated 4 and the discharges 58a, 58b, 58c and the surface area of the gas-liquid interface, and as a result, the water treatment is performed efficiently.

Note that the fourteenth embodiment maybe combined as appropriate with the ninth to eleventh embodiments. For example, in the apparatus according to the fourteenth embodiment, the flow rate of the circulating gas may be varied over time so as to form a pulsating flow. Further, the water treatment unit 63 according to the fourteenth embodiment may be disposed in multiple stages, as in the tenth or eleventh embodiment.

Fifteenth Embodiment

Figure 29:
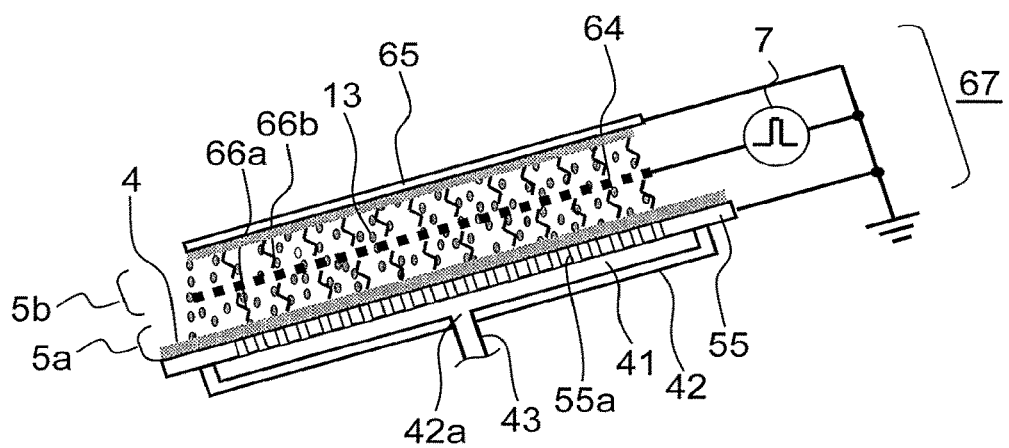
FIG. 29 is a sectional view showing main parts of a water treatment apparatus according to a fifteenth embodiment of this invention.

FIG. 29 is a sectional view showing main parts of a water treatment apparatus according to a fifteenth embodiment of this invention. A mesh electrode 64 serving as the discharge forming body is disposed above the tilted plate 55 so as to be parallel to the tilted plate 55 across a void 5a. The mesh electrode 64 is connected to the pulse power supply 7. The tilted plate 55 is made of metal and grounded. In other words, the tilted plate 55 doubles as a plate electrode (a ground electrode).

An upper plate electrode 65 serving as the discharge forming body is disposed above the mesh electrode 64 so as to be parallel to the mesh electrode 64 across a void 5b. The upper plate electrode 65 is grounded. The mesh electrode 64 and the tilted plate 55 form a pair from which a discharge 66a is formed. The mesh electrode 64 and the upper plate electrode 65 form a pair from which a discharge 66b is formed.

A water treatment unit 67 according to the fifteenth embodiment includes the tilted plate 55, the mesh electrode 64, the upper plate electrode 65, and the back plate 42. All other configurations and operations are similar or identical to the twelfth embodiment.

With the water treatment apparatus and water treatment method described above, the discharge 66a is formed between the mesh electrode 64 and the tilted plate 55, and the discharge 66b is formed between the mesh electrode 64 and the upper plate electrode 65. Further, some of the droplets 13 that splash up from the tilted plate 55 pass through the mesh electrode 64 so as to collide with the upper plate electrode 65.

Therefore, a formation region of the discharges 66a, 66b can be expanded in comparison with a case such as that of the eighth embodiment, in which the discharges 11a, 11b, 11c are formed only between the wire electrodes 6a, 6b, 6c and the plate electrode 2, and as a result, an increase in the speed of the water treatment is achieved.

Further, some of the droplets 13 that splash up collide with the upper plate electrode 65, and some of those droplets form new droplets 13 that drop down toward the tilted plate 55. Moreover, another part of the droplets 13 that collide with the upper plate electrode 65 flow over the upper plate electrode 65 in response to surface tension. Hence, increases are obtained in the contact time between the water to be treated 4 and the discharges 66a, 66b and the surface area of the gas-liquid interface, and as a result, the water treatment is performed efficiently.

Note that the fifteenth embodiment may be combined as appropriate with the ninth to eleventh embodiments. For example, in the apparatus according to the fifteenth embodiment, the flow rate of the circulating gas may be varied over time so as to form a pulsating flow. Further, the water treatment unit 67 according to the fifteenth embodiment maybe disposed in multiple stages, as in the tenth or eleventh embodiment.

Sixteenth Embodiment

Figure 30:
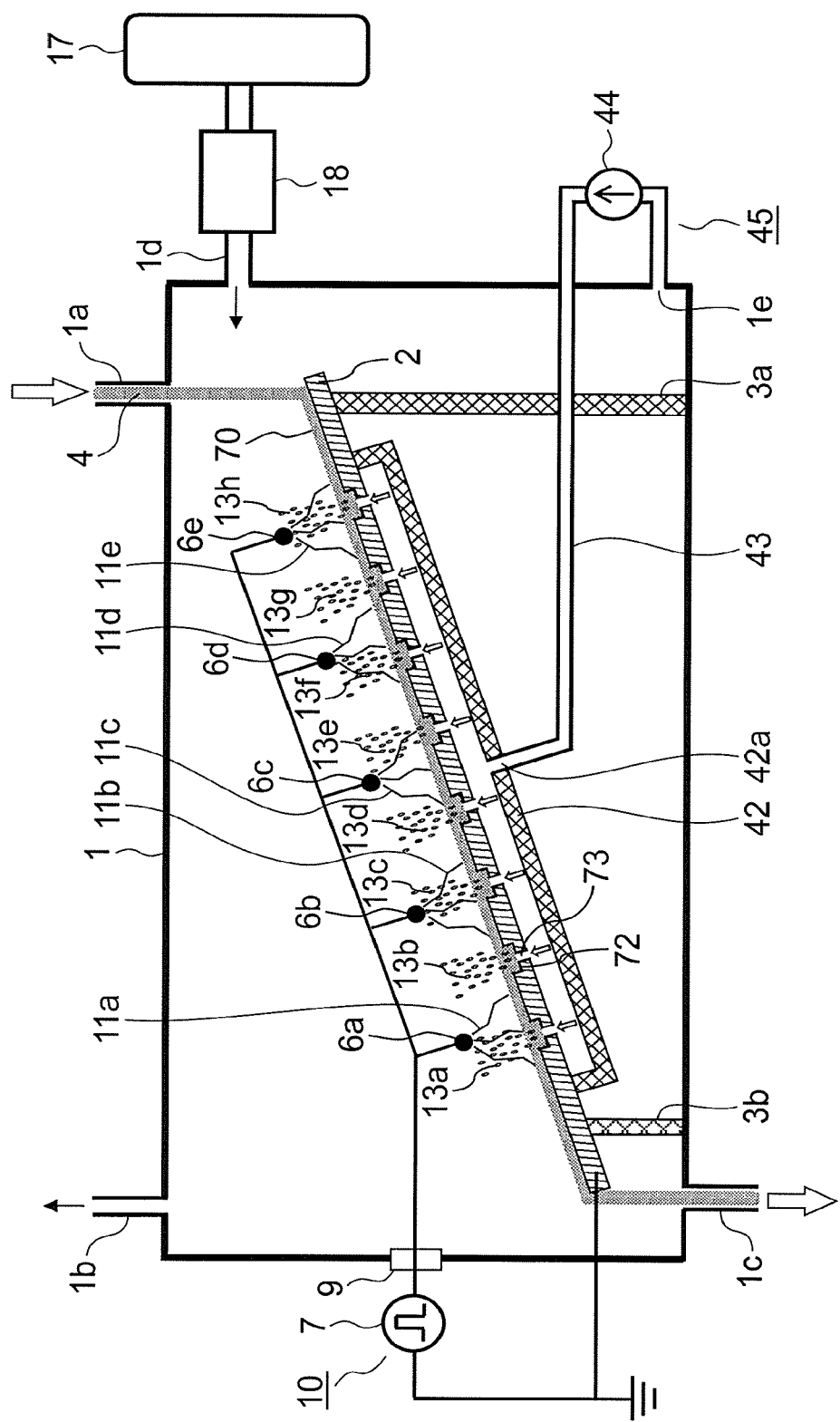
FIG. 30 is a sectional view showing a water treatment apparatus according to a sixteenth embodiment of this invention.
Figure 31:
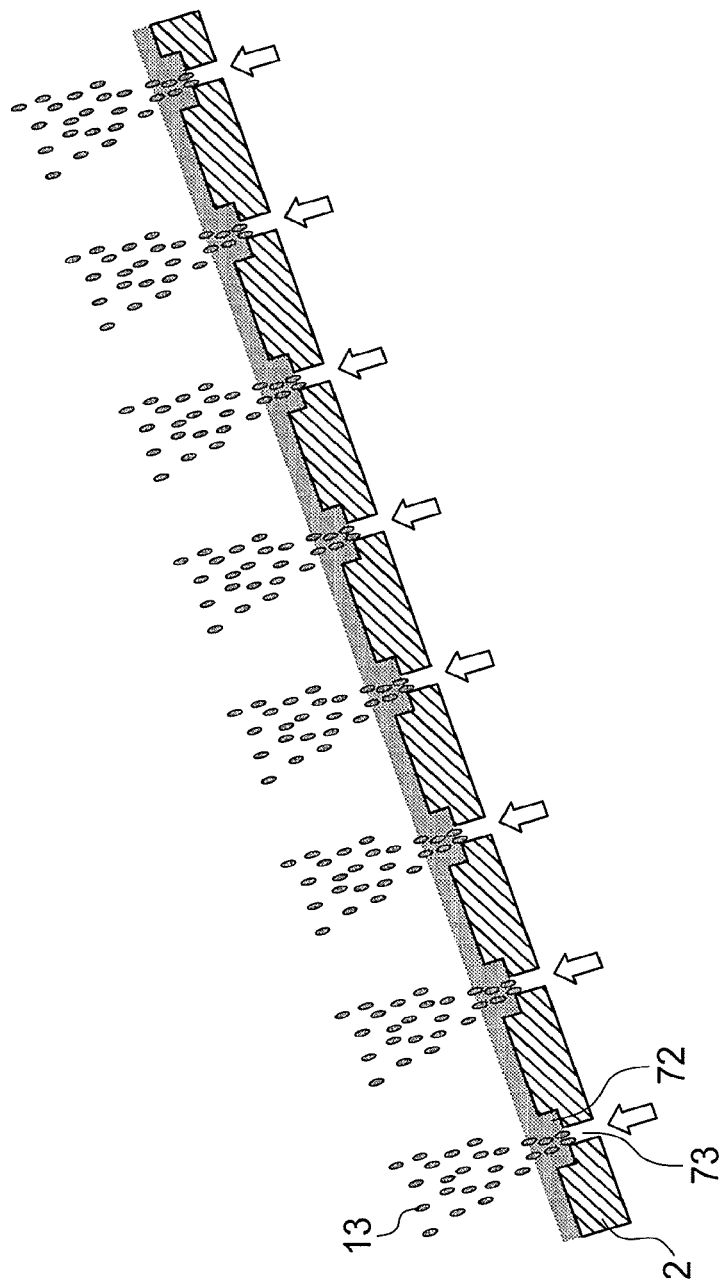
FIG. 31 is a sectional view showing only a plate electrode of FIG. 30.
Figure 32:
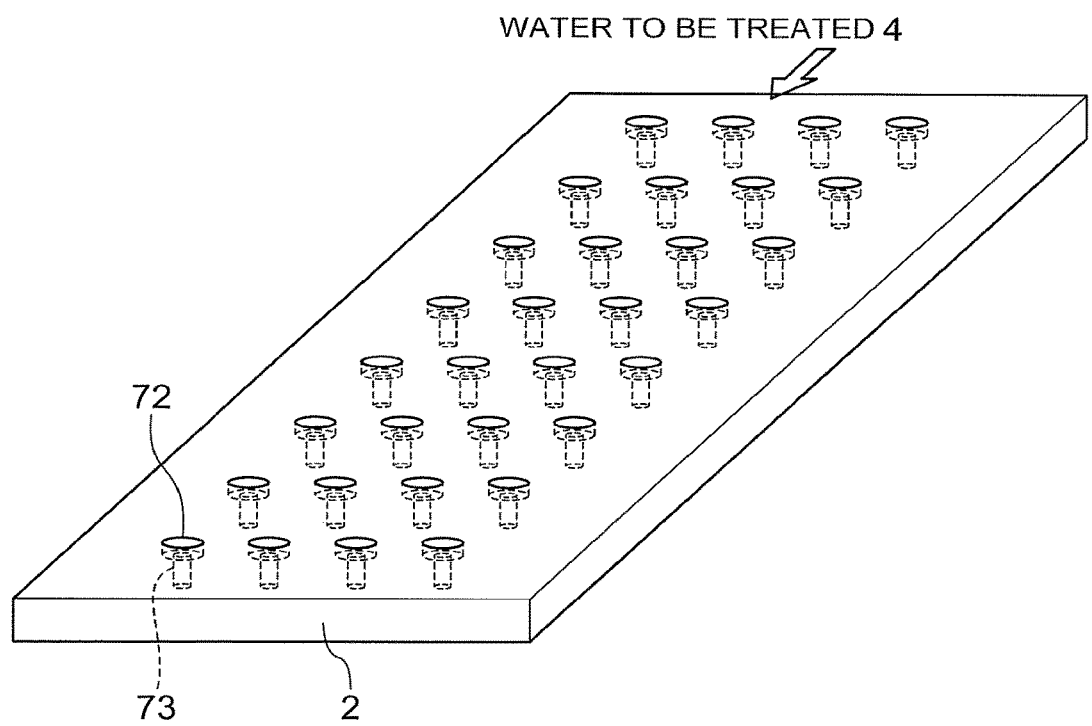
FIG. 32 is a perspective view showing the plate electrode of FIG. 30.

FIG. 30 is a sectional view showing a water treatment apparatus according to a sixteenth embodiment of this invention. FIG. 31 is a sectional view showing only the plate electrode 2 of FIG. 30, and FIG. 32 is a perspective view showing the plate electrode 2 of FIG. 30. The sixteenth embodiment differs from the eighth embodiment only in the shape of the plate electrode 2.

A plurality of (in FIG. 32, thirty-two) recessed portions 72 are formed in the upper surface of the plate electrode 2 so as to be recessed relative to other parts. The recessed portions 72 have a circular sectional shape parallel to the upper surface of the plate electrode 2. A narrow hole 73 that penetrates the plate electrode 2 in the thickness direction is formed in the center of each recessed portion 72. All other configurations are similar or identical to the eighth embodiment.

In the water treatment apparatus according to this invention, the water treatment efficiency improves as the water film 70 becomes thinner. The reason for this is that the oxidizing particles generated by discharge, such as OH and $O_3$, react rapidly on the surface layer of the water film 70, thereby decomposing the organic substance, but take time to diffuse to the deep part of the water film 70.

Meanwhile, an improved water treatment performance is obtained as the number of droplets 13 formed by the droplet forming apparatus increases. The reason for this is that when a large number of droplets are formed, the surface area of the water to be treated 4 increases, leading to an increase in reaction frequency between the water to be treated 4 and the oxidizing particles such as OH and $O_3$, thereby promoting dissolution of the OH and $H_2O_2$.

In the eighth embodiment, when the water film 70 is thin, the organic substance in the vicinity of the bottom portion of the water film 70 is decomposed easily. However, a large number of droplets cannot be formed even when gas is ejected through the narrow holes 2b. Conversely, when the water film 70 is thick, a large number of droplets are formed, but decomposition of the organic substance in the deep portion of the water film 70 does not progress. In other words, it is desirable in the eighth embodiment to realize both efficient treatment of the organic substance in the water film 70 and formation of a large number of droplets.

According to the sixteenth embodiment, meanwhile, the recessed portions 72 are formed in the upper surface of the plate electrode 2, and the narrow holes 73 are opened in the bottom portions of the respective recessed portions 72. Therefore, the water film 70 is thick in the vicinity of the narrow holes 73 and thin in the remaining regions. As a result, efficient treatment of the organic substance in the water film 70 and formation of a large number of droplets can both be realized.

Figure 33:
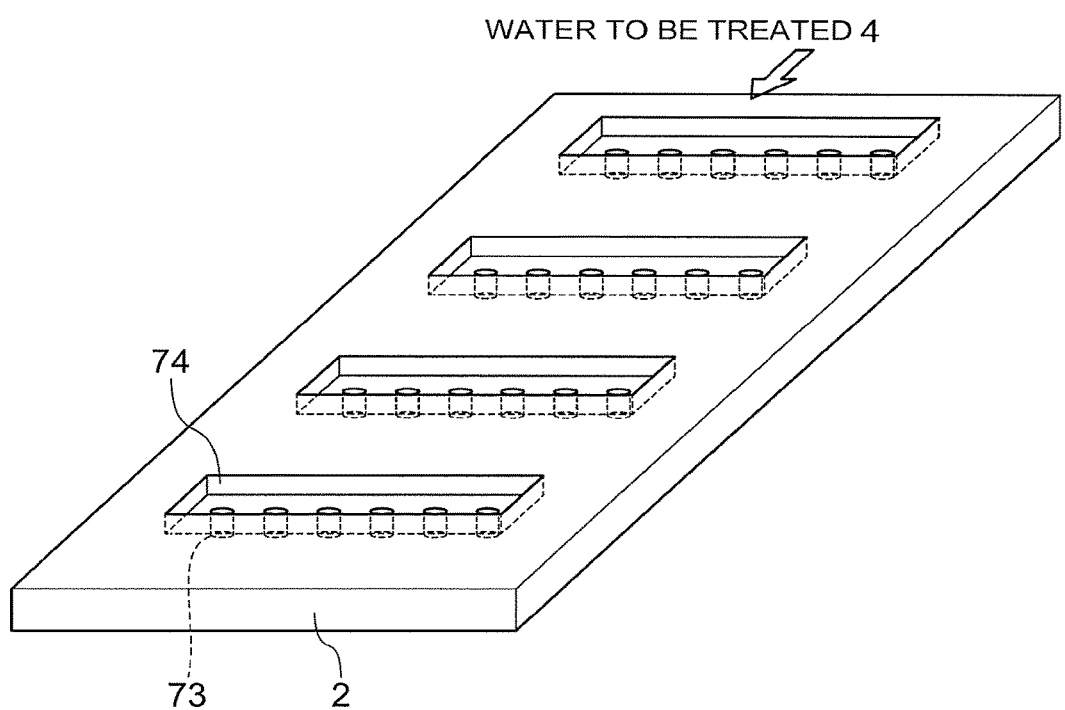
FIG. 33 is a perspective view showing a first modified example of a shape of a recessed portion shown in FIG. 32.

Note that the recessed portions 72 do not necessarily have to be formed in a columnar shape, as shown in FIG. 32. Further, the narrow holes 73 and the recessed portions 72 do not necessarily have to correspond at a 1:1 ratio. As shown in FIG. 33, for example, a plurality of (in FIG. 33, four) recessed portions 74 having a rectangular flat plate shape (a rectangular cross-section parallel to the upper surface of the plate electrode 2) may be provided in the upper surface of the plate electrode 2, and two or more (in FIG. 33, six) narrow holes 73 may be provided in each recessed portion 74. In FIG. 33, the recessed portions 74 are disposed such that long sides thereof are at a right angle to the flow of the water to be treated 4. With this configuration, an improvement in workability is achieved.

Figure 34:
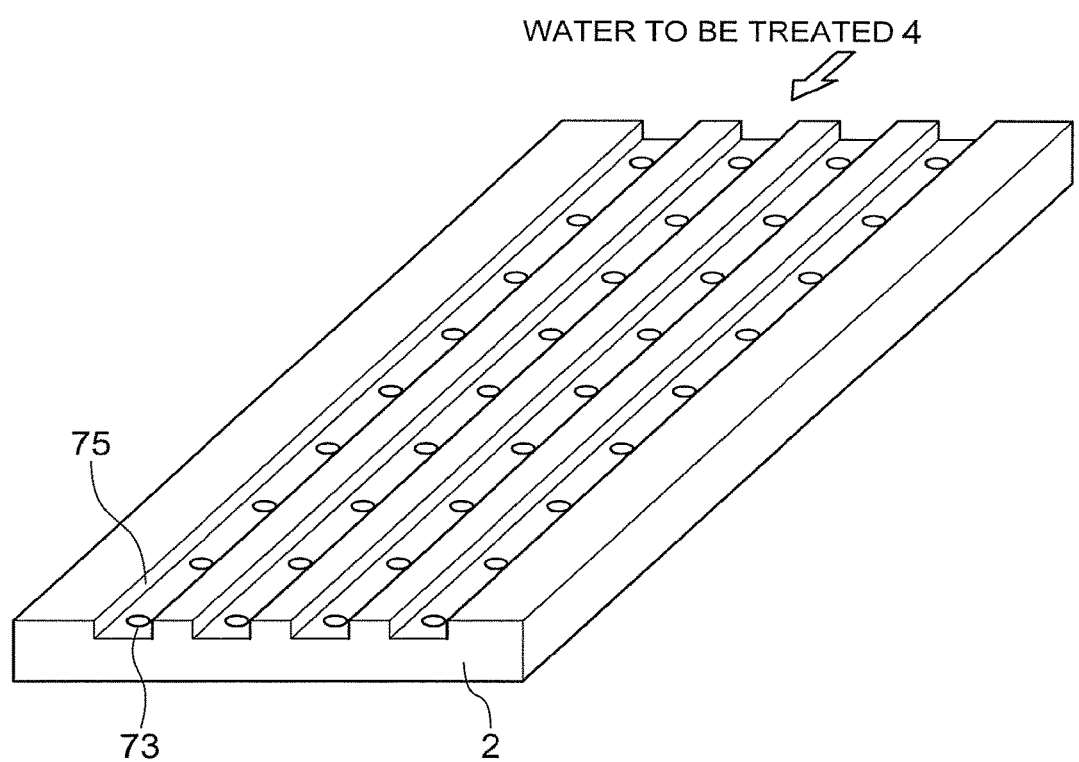
FIG. 34 is a perspective view showing a second modified example of the shape of the recessed portion shown in FIG. 32.

Alternatively, as shown in FIG. 34, a plurality of (in FIG. 34, four) groove-form recessed portions 75 may be provided in the upper surface of the plate electrode 2, and two or more (in FIG. 34, nine) narrow holes 73 may be provided in each recessed portion 75. In FIG. 34, the recessed portions 75 are disposed parallel to the flow direction of the water to be treated 4 at intervals in a right angle direction relative to the flow of the water to be treated 4. With this configuration, the droplets can be formed effectively, as described above, and the water to be treated 4 can flow evenly, without bias, over the surface of the plate electrode 2.

Note that a combination of a plurality of types of recessed portions having different shapes may also be used.

Further, the configuration in which recessed portions are formed in the upper surface of the plate electrode 2 may be combined as appropriate with another embodiment. For example, recessed portions may be formed in the upper surface of the plate electrode 2 according to the first embodiment in the parts where the ultrasonic transducers 12a, 12b, 12c are disposed. Likewise in this case, when an optimum frequency corresponding to the thickness of the water film 70 is applied, a steadily larger number of droplets can be generated as the thickness of the water film 70 on the upper portions of the ultrasonic transducers 12a, 12b, 12c increases.

Seventeenth Embodiment

Figure 35:
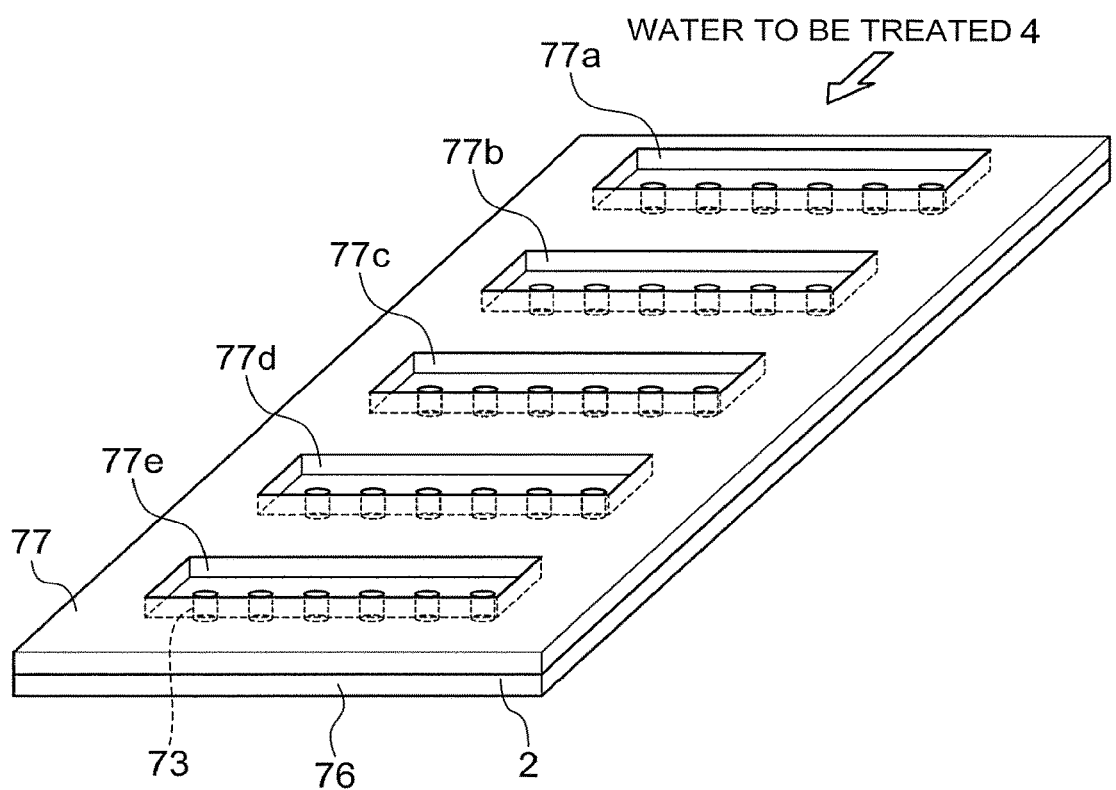
FIG. 35 is a perspective view showing a plate electrode of a water treatment apparatus according to a seventeenth embodiment of this invention.
Figure 36:
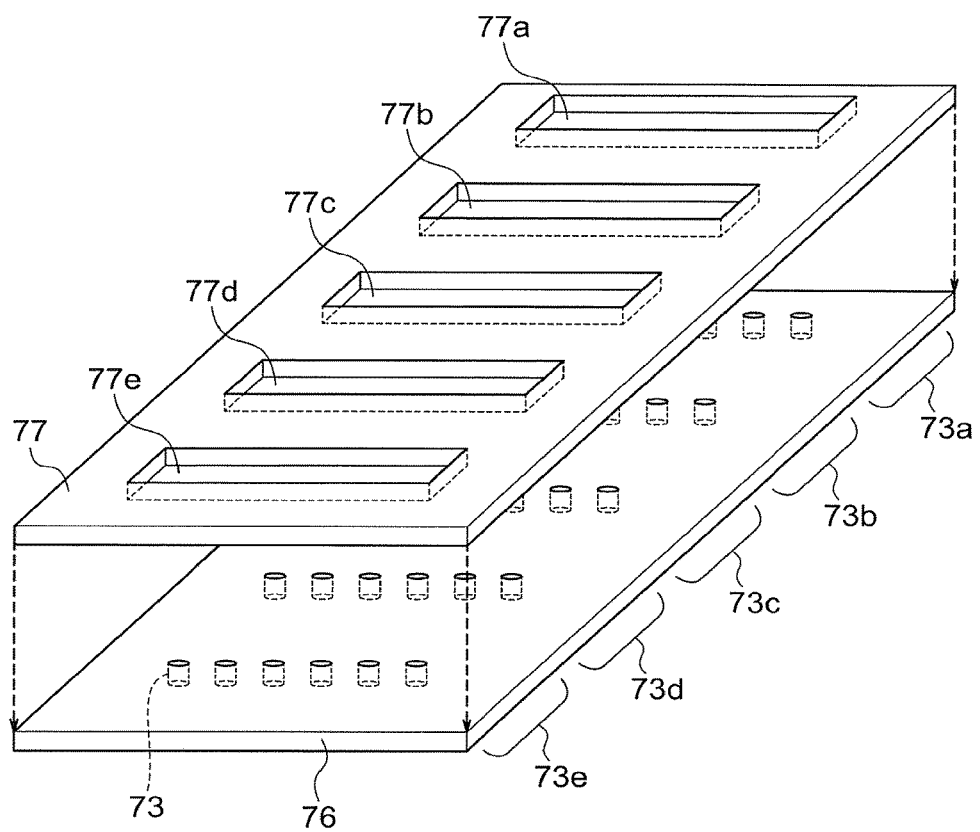
FIG. 36 is an exploded perspective view showing the plate electrode of FIG. 35.

FIG. 35 is a perspective view showing the plate electrode 2 of a water treatment apparatus according to a seventeenth embodiment of this invention, and FIG. 36 is an exploded perspective view showing the plate electrode 2 of FIG. 35. The seventeenth embodiment differs from the sixteenth embodiment in the method of forming the plate electrode 2. More specifically, in the seventeenth embodiment, the plate electrode 2 is formed by overlapping a lower plate 76 constituted by a rectangular flat plate with an upper plate 77 constituted by a rectangular flat plate.

A plurality of (in this example, thirty) narrow holes 73 that penetrate the lower plate 76 in a thickness direction are provided in the lower plate 76. In this example, five rows of narrows holes 73a to 73e are formed in the lower plate 76. Six narrow holes 73 are disposed in each row of narrow holes 73a to 73e and arranged at a right angle relative to the flow of the water to be treated 4. Further, the rows of narrow holes 73a to 73e are disposed at intervals in the flow direction of the water to be treated 4.

Five through holes 77a to 77e, each having a rectangular planar shape, are provided in the upper plate 77. The through holes 77a to 77e are disposed at intervals in the flow direction of the water to be treated 4. The through holes 77a to 77e are disposed such that respective long sides thereof are at a right angle relative to the flow direction of the water to be treated 4.

An opening area of each through holes 77a to 77e is larger than an opening area of each narrow hole 73. The narrow holes 73 are disposed to open onto the corresponding through holes 77a to 77e when the upper plate 77 overlaps the lower plate 76. As a result, the through holes 77a to 77e function similarly to the recessed portions 74 shown in FIG. 33. All other configurations are similar or identical to the sixteenth embodiment.

In the sixteenth embodiment, milling must be implemented on the plate electrode 2 in order to form the recessed portions 72, 74, 75. According to the seventeenth embodiment, on the other hand, the plate electrode 2 can be formed by forming the upper plate 77 and the lower plate 76 by laser processing, punching, or the like and then adhering the two plates to each other. As a result, the plate electrode 2 can be manufactured at low cost, thereby facilitating a size increase in and mass production of the plate electrode 2.

Note that there are no particular limitations on the method of fixing the upper plate 77 to the lower plate 76, and welding, brazing, adhering, and so on, for example, may be used.

Eighteenth Embodiment

Figure 37:
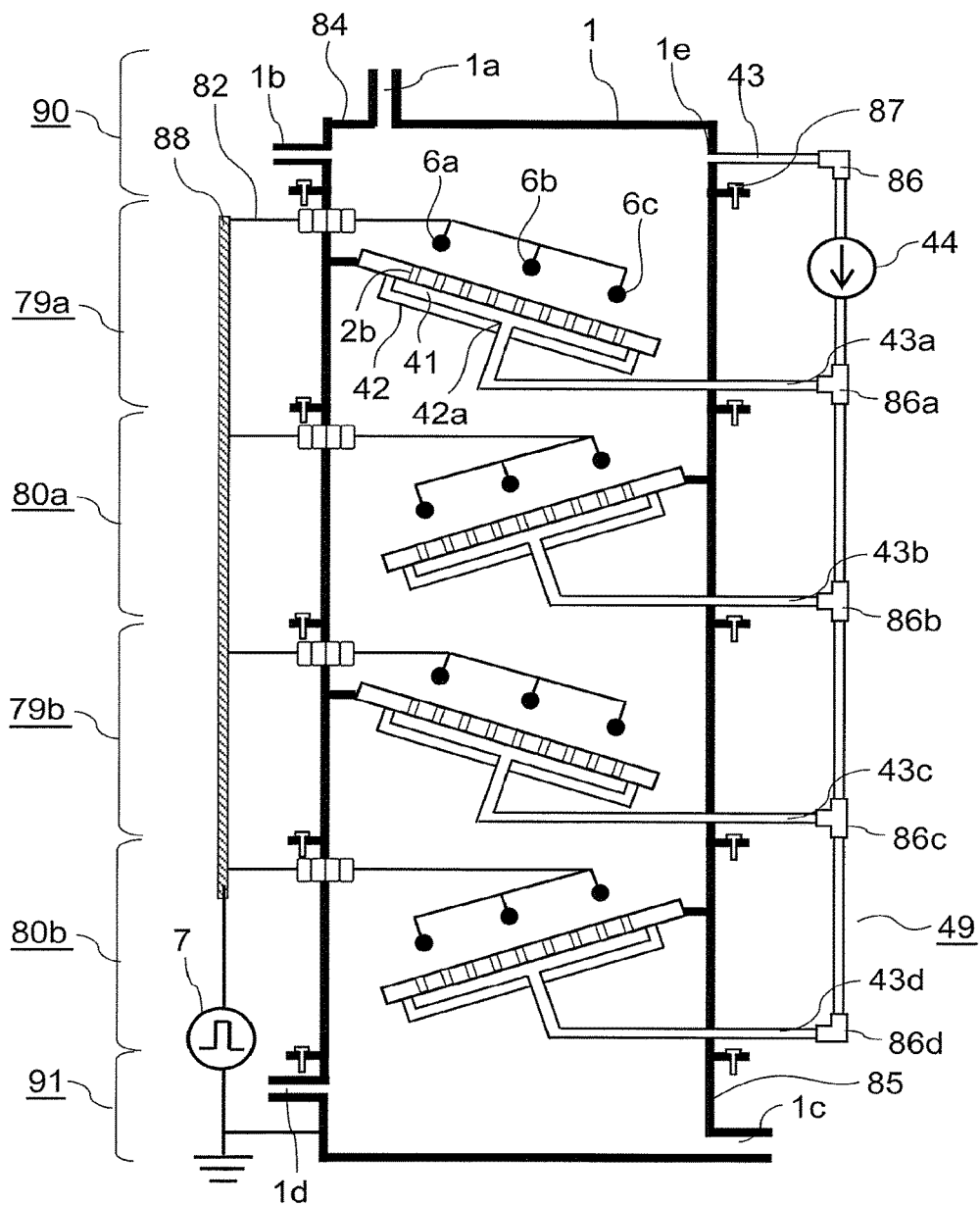
FIG. 37 is a sectional view showing a water treatment apparatus according to an eighteenth embodiment of this invention.

FIG. 37 is a sectional view showing a water treatment apparatus according to an eighteenth embodiment of this invention. The water treatment apparatus according to the eighteenth embodiment includes an upper portion unit 90, a lower portion unit 91, two first intermediate units (water treatment units) 79a, 79b, and two second intermediate units (water treatment units) 80a, 80b.

The upper portion unit 90 is disposed in an uppermost portion of the water treatment apparatus. The lower portion unit 91 is disposed in a lowermost portion of the water treatment apparatus. The first intermediate units 79a, 79b and second intermediate units 80a, 80b are disposed alternately in a vertical direction between the upper portion unit 90 and the lower portion unit 91.

More specifically, the first intermediate unit 79a is disposed below the upper portion unit 90, the second intermediate unit 80a is disposed below the first intermediate unit 79a, the first intermediate unit 79b is disposed below the second intermediate unit 80a, the second intermediate unit 80b is disposed below the first intermediate unit 79b, and the lower portion unit 91 is disposed below the second intermediate unit 80b.

Figure 38:
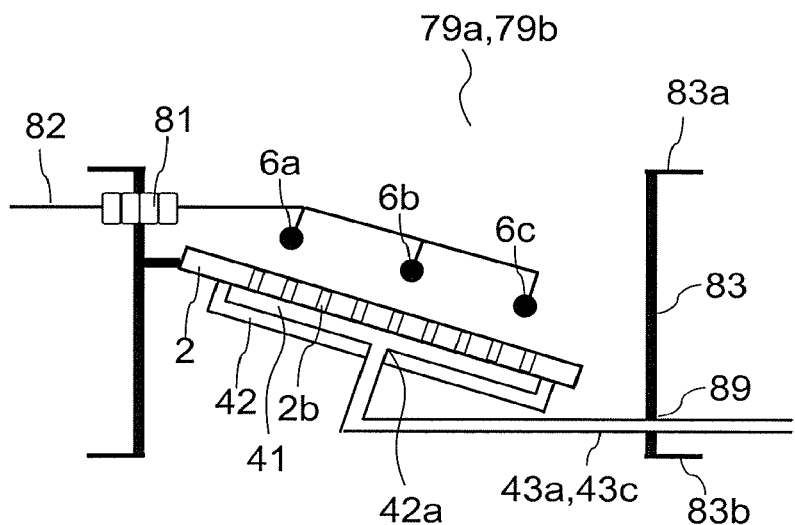
FIG. 38 is a sectional view showing a first intermediate unit of FIG. 37.
Figure 39:
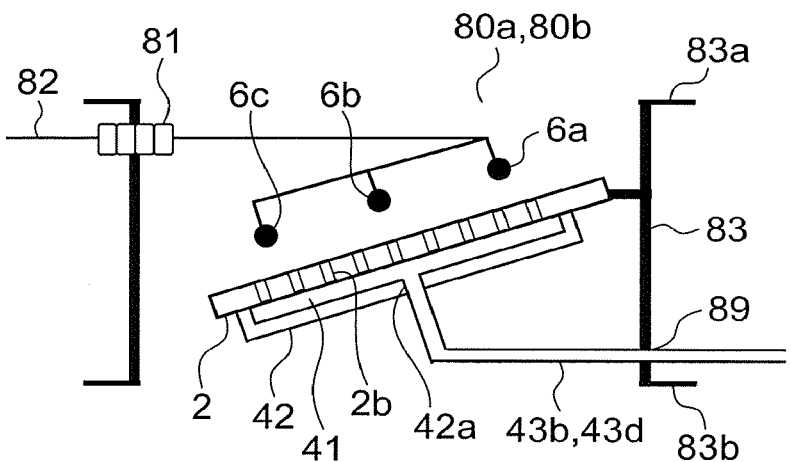
FIG. 39 is a sectional view showing a second intermediate unit of FIG. 37.

Further, parts of vertically adjacent units forming the treatment tank 1 are fastened to each other hermetically using a plurality of bolts 87 serving as fastening members so as to be electrically conductive. FIG. 38 shows a cross-section of the first intermediate units 79a, 79b, and FIG. 39 shows a cross-section of the second intermediate units 80a, 80b.

In FIG. 38, the first intermediate units 79a, 79b respectively include the plate electrode 2, the back plate 42, the branch pipe 43a or 43c, the wire electrodes 6a, 6b, 6c, and a casing 83. The casing 83 takes the shape of a duct having a rectangular cross-section, and surrounds the plate electrode 2, the back plate 42, and the wire electrodes 6a, 6b, 6c. The plate electrode 2 is fixed to a side wall of the casing 83 in the interior of the casing 83.

An introduction terminal 81 for introducing a high voltage wire 82 and a feedthrough 89 penetrated by the gas circulation pipe 43 are formed in the side wall of the casing 83. The wire electrodes 6a, 6b, 6c are respectively connected to the high voltage wire 82. The high voltage wire 82 communicates with the exterior of the casing 83 via the introduction terminal 81.

An upper portion flange 83a is provided in an upper end portion of the casing 83. A lower portion flange 83b is provided in a lower end portion of the casing 83. Further, the plate electrode 2 is tilted downward toward the right side in FIG. 38.

In FIG. 39, the second intermediate units 80a, 80b respectively include the plate electrode 2, the back plate 42, the branch pipe 43b or 43d, the wire electrodes 6a, 6b, 6c, and the casing 83. The plate electrode 2 is tilted downward toward the left side in FIG. 39, but apart from the fact that the plate electrode 2 is tilted downward toward the left side, the second intermediate units 80a, 80b are identical to the first intermediate units 79a, 79b. In other words, the second intermediate units 80a, 80b differ from the first intermediate units 79a, 79b only in that the plate electrode 2 is tilted in an opposite direction.

The water feed port 1a, the gas discharge port 1b, and the gas intake port 1e are provided in the upper portion unit 90. A casing 84 of the upper portion unit 90 is fastened to the upper portion flange 83a of the casing 83 of the first intermediate unit 79a.

The water discharge port 1c and the gas supply port 1d are provided in the lower portion unit 91. A casing 85 of the lower portion unit 91 is fastened to the lower portion flange 83b of the casing 83 of the second intermediate unit 80b.

The high voltage wires 82 extending from the first intermediate units 79a, 79b and the second intermediate units 80a, 80b are respectively connected to a bus bar 88 on the exterior of the casings 83. The bus bar 88 is connected to a high voltage output of the pulse power supply 7. A ground side of the pulse power supply 7 is connected to the lower portion unit 91.

Further, the branch pipes 43a, 43b, 43c, 43d are connected in parallel to the gas intake port 1e by respective joints 86a, 86b, 86c, 86d. Furthermore, the air pump 44 is disposed between the gas intake port 1e and the joint 86a. All other configurations and operations are similar or identical to the tenth embodiment.

According to the eighteenth embodiment, the treatment tank 1 can be formed simply by connecting the first intermediate units 79a, 79b, the second intermediate units 80a, 80b, the upper portion unit 90, and the lower portion unit 91 using the bolts 87. As a result, the treatment tank 1 can be manufactured and assembled more easily than when the treatment tank 1 is formed integrally.

Further, the number of first intermediate units 79a, 79b and second intermediate units 80a, 80b may be determined as desired. For example, when the treatment subject is the water to be treated 4 containing a highly concentrated organic substance or the water to be treated 4 containing a persistent substance, a superior treatment effect can be obtained by increasing the number of first intermediate units 79a, 79b and second intermediate units 80a, 80b.

Conversely, when the treatment subject is the water to be treated 4 containing an organic substance at a low concentration or the water to be treated 4 not containing a persistent substance, ineffective discharge power consumption can be suppressed by reducing the number of first intermediate units 79a, 79b and second intermediate units 80a, 80b. Moreover, the treatment tank 1 can be simplified and reduced in size, and therefore apparatus costs and running costs can be suppressed.

Note that in the eighth to eighteenth embodiments, the apparatus that forms the circulating gas is not limited to the air pump 44, and a blower, a compressor, or the like, for example, may be used instead.

Further, a combination of a plurality of different types of droplet forming apparatuses may be used in the single treatment tank. For example, an appropriate combination of the droplet forming apparatuses according to the first, third, fifth, sixth, seventh, and eighth embodiments may be used.

Furthermore, the discharge forming bodies according to the twelfth to fifteenth embodiments may be combined with the droplet forming apparatuses according to the first, third, fifth, sixth, and seventh embodiments.

Moreover, the droplet according to this invention signifies a collection of liquid form water molecules existing in a gas, and there are no particular limitations on the particle diameter and number density thereof. For example, when an ultrasonic transducer is used, the droplet diameter varies according to the frequency, but any droplets, from mist-form droplets having a droplet diameter of several micrometers to comparatively large droplets having a droplet diameter of several millimeters, may be formed.

Further, in the method of using a gas according to the fifth and sixth embodiments and the method of using the splashing mechanism 28 according to the seventh embodiment, droplets having a droplet diameter between 0.1 millimeter and several millimeters are formed. The droplet formation method, droplet diameter, and number density may be determined such that the speed and efficiency of the water treatment are optimized.

The invention claimed is:

1. A water treatment apparatus comprising:
   a tilted plate disposed at an incline relative to a horizontal plane so that water to be treated flows over an upper surface thereof, wherein a narrow hole is provided in the tilted plate so as to penetrate the tilted plate in a thickness direction;
   a discharge forming body that is disposed across a gas layer above a water film formed by the water to be treated flowing over the tilted plate, and forms a discharge by applying a voltage between the discharge forming body and the tilted plate, and a droplet forming apparatus configured to perform an operation for exerting power on the water film so that droplets shoot up from the water film, wherein the droplet forming apparatus is a gas ejection apparatus that forms droplets by ejecting gas upward through the narrow hole so that the water to be treated splashes up to shoot upward and form droplets, wherein treatment is performed on the water to be treated by bringing the droplets, which are formed by the power exerted by the droplet forming apparatus, into contact with the discharge.

2. The water treatment apparatus according to claim 1, wherein a plurality of water treatment units, each including the tilted plate and the discharge forming body, are disposed so as to be arranged in a vertical direction, and the respective tilted plates are tilted in alternating opposite directions relative to the horizontal plane so that the water to be treated flows continuously downward from an uppermost water treatment unit to a lowermost water treatment unit.

3. The water treatment apparatus according to claim 2, wherein the water treatment units each further include a casing that surrounds the tilted plate and the discharge forming body, and the casings of the water treatment units that are vertically adjacent are fastened to each other.

4. The water treatment apparatus according to claim 1, wherein at least one of a tilt angle of the tilted plate, a flow rate of the water to be treated, and a discharge power is adjustable.

5. The water treatment apparatus according to claim 4, further comprising:

a water quality meter that detects a water quality of the water to be treated; and a centralized control unit that adjusts at least one of the tilt angle of the tilted plate, the flow rate of the water to be treated, and the discharge power on the basis of information from the water quality meter.

6. The water treatment apparatus according to claim 1, wherein, on the tilted plate, a thickness of the water film covering the narrow hole is greater than a thickness of the water film covering a region of the tilted plate other than the narrow hole.

7. The water treatment apparatus according to claim 6, wherein the tilted plate includes a lower plate in which the narrow hole is provided and an upper plate that overlaps the lower plate, a through hole is provided in the upper plate, an opening area of the through hole is larger than an opening area of the narrow hole, and in a condition where the upper plate overlaps the lower plate, the narrow hole is disposed so as to open onto the through hole.

8. The water treatment apparatus according to claim 1, wherein the droplets are caused to collide with the discharge forming body.

9. The water treatment apparatus according to claim 1, wherein the droplet forming apparatus is operated intermittently.

10. The water treatment apparatus according to claim 1, wherein the droplet forming apparatus is operated in synchronization with formation of the discharge.

11. A water treatment method for treating water to be treated comprising:

passing the water to be treated over an upper surface of a tilted plate disposed at an incline relative to a horizontal plane so that a water film is formed on the tilted plate, wherein a narrow hole is provided in the tilted plate so as to penetrate the tilted plate in a thickness direction;

forming, via a discharge forming body that is disposed across a gas layer above the water film, a discharge by applying a voltage between the discharge forming body and the tilted plate;

performing, via a droplet forming apparatus, an operation for exerting power on the water film so that droplets shoot up from the water film, wherein the droplet forming apparatus is a gas ejection apparatus that forms droplets by ejecting gas upward through the narrow hole so that the water to be treated splashes up to shoot upward and form droplets; and performing treatment on the water to be treated by bringing the droplets formed by the power exerted by the droplet forming apparatus into contact with the discharge.

* * * * *